United States Patent
Shurtz

(10) Patent No.: US 9,582,985 B2
(45) Date of Patent: Feb. 28, 2017

(54) SYSTEM AND METHOD FOR MITIGATING EMERGENCY CALL FAILURE

(71) Applicant: TELEFONAKTIEBOLAGET L M ERICSSON (PUBL), Stockholm (SE)

(72) Inventor: Jack Shurtz, Thornton, CO (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/919,621

(22) Filed: Oct. 21, 2015

(65) Prior Publication Data
US 2016/0379470 A1 Dec. 29, 2016

Related U.S. Application Data

(60) Provisional application No. 62/185,210, filed on Jun. 26, 2015.

(51) Int. Cl.
*H04M 11/04* (2006.01)
*G08B 25/00* (2006.01)
*H04W 4/22* (2009.01)
*H04W 4/16* (2009.01)
*G08B 25/10* (2006.01)

(52) U.S. Cl.
CPC ............. *G08B 25/004* (2013.01); *G08B 25/10* (2013.01); *H04W 4/16* (2013.01); *H04W 4/22* (2013.01)

(58) Field of Classification Search
CPC .......................... H04W 12/08; H04M 2242/04
USPC ............ 455/404.1, 414.1, 466, 404.2, 456.3,455/452.1; 379/45, 37, 52; 370/352
See application file for complete search history.

(56) References Cited

U.S. PATENT DOCUMENTS

| | | | |
|---|---|---|---|
| 7,155,201 B2 | 12/2006 | Lugo Saucedo et al. | |
| 2006/0274729 A1* | 12/2006 | Self | H04L 29/06027 370/352 |
| 2010/0261448 A1* | 10/2010 | Peters | H04W 76/007 455/404.1 |
| 2011/0086607 A1* | 4/2011 | Wang | H04M 3/5116 455/404.1 |

OTHER PUBLICATIONS

NENA Technical Information Document on the Interface between the E9-1-1 Service Provider's Network and the Internet Protocol (IP) PSAP, NENA-01-00x Issued Feb. 2003, the whole document.

* cited by examiner

*Primary Examiner* — Kiet Doan

(57) ABSTRACT

An emergency call failure mitigation apparatus, system and method includes a messaging subsystem that may be launched, upon receiving a call signaling indication pursuant to an emergency service call from a calling party that has failed to reach a local Public Safety Answering Point (PSAP). The messaging subsystem is operative to prompt the calling party to provide one or more responses relating to the emergency situation and generate a messaging object including at least one of the calling party's location, identity of a call receiving device associated with the calling party, type of the calling party and priority of the emergency service call determined based on one or more responses of provided by the calling party. In one embodiment, the messaging object may be forwarded to an entity operative to reach the calling party.

25 Claims, 14 Drawing Sheets

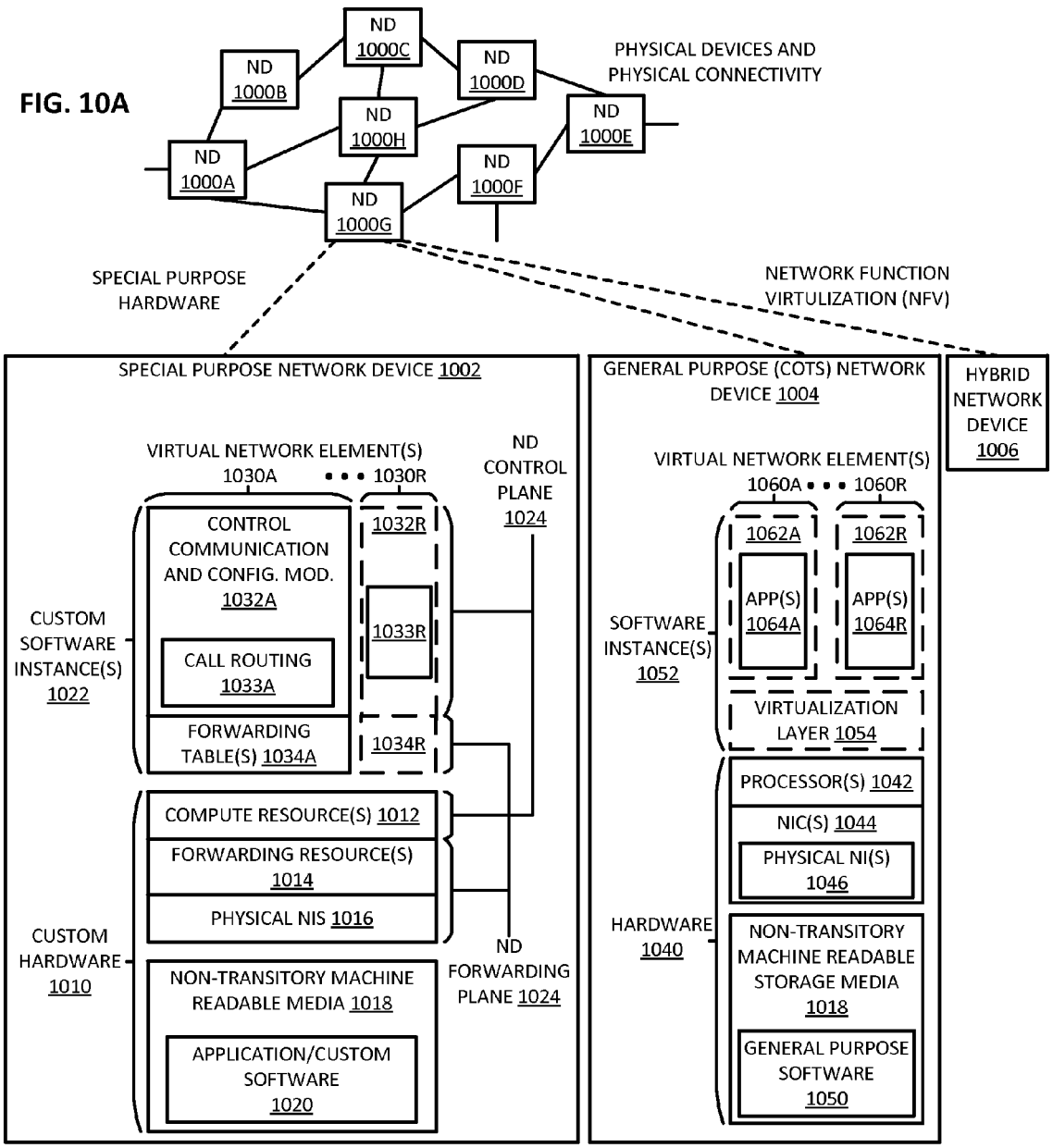

SYSTEM AND METHOD FOR MITIGATING EMERGENCY CALL FAILURE

PRIORITY UNDER 35 U.S.C. §119(e) & 37 C.F.R. §1.78

This nonprovisional application claims priority based upon the following prior United States provisional patent application(s): (i) "EMERGENCY MASS CALL FAILURE MITIGATION SYSTEM AND METHOD," Application No. 62/185,210, filed Jun. 26, 2015, in the name(s) of Jack Shurtz; each of which is hereby incorporated by reference in its entirety.

FIELD OF THE DISCLOSURE

The present disclosure generally relates to Emergency Call Services. More particularly, and not by way of any limitation, the present disclosure is directed to a system and method for mitigating emergency call failures in a network.

BACKGROUND

Existing solutions in place for emergency call failures typically fall into two schools of thought. One school tries to route the failed emergency call to a fallback number at the Public Safety Answering Point (PSAP) that is usually an Administrative Line not manned in the same way as the regular call taker positions. The other school involves returning some kind of treatment message from the serving network switch, which in most cases is typically a "fast busy" signal. Clearly, neither of these approaches is satisfactory in an emergency call scenario.

SUMMARY

The present patent disclosure is broadly directed to an emergency call failure mitigation scheme that includes a messaging subsystem, which may be launched upon receiving a call signaling indication pursuant to an emergency service call from a calling party that has failed to reach a local Public Safety Answering Point (PSAP). The messaging subsystem is operative to prompt the calling party to provide one or more responses relating to the emergency situation and generate a messaging object including various pieces of information such as, e.g., the calling party's location, identity of a call receiving device associated with the calling party, type of the calling party, nature of the emergency, and priority of the emergency service call determined based on one or more responses of provided by the calling party, among others. In one embodiment, the messaging object may be forwarded to one or more network entities, other public safety services, third-party entities, etc., that may be operative to reach the calling party.

In a broad emergency call setup and failure mitigation scenario, an embodiment of the present invention may involve the following, inter alia: When an emergency call is initiated through a single number dialing system (e.g., "911" or "112", and the like), the call may be set up by utilizing routing information that is either internal to the telecommunications switching equipment, or delivered by another network element. The physical communications connections may be confirmed through an associated data network utilizing technologies such as Signaling System 7 (SS7) or Transmission Control Protocol/Internet Protocol (TCP/IP) before the physical connection is built. If the connection is confirmed, and a bearer path of the call is set up, the PSAP has the ability to receive information about the caller, their location, etc. If for some reason, the connection confirmation fails, a failure code is delivered to the Switch equipment, and a prescribed action is taken. Depending on the prescribed action, the associated caller information including their current location in the case of a wireless caller may be lost. An example embodiment may be configured to route the failed call to an integrated messaging platform that queries the caller with respect to the emergency situation, e.g., whether the caller is the person requiring assistance, or if the caller is reporting an emergency situation for another party, etc. While the call is established, the messaging platform also preferably queries the same systems that are used by the PSAP and record the information that is usually delivered to the PSAP during an emergency call. That data as well as the data gained from querying the caller may be added or otherwise integrated into a suitable message object, e.g., email/SMS/MMS message along with an attachment containing the actual voice recording, and sent to the PSAP that the call was originally being routed to when the call failed.

In one aspect, an embodiment of an emergency call failure mitigation method is disclosed, which comprises, inter alia: receiving an emergency service call from a calling party pertaining to an emergency situation and determining that no voice trunking path is available to a PSAP (e.g., a local PSAP) to service the emergency service call. Responsive thereto, the calling party is routed to an intelligent messaging system operative to prompt the calling party to provide one or more responses relating to the emergency situation. The messaging system is adapted to generate a messaging object including at least one of the calling party's location, identity of a call receiving device associated with the calling party, type of the calling party, nature of the emergency, and priority of the emergency service call determined based on one or more responses provided by the calling party, among others, and forward the messaging object to one or more entities operative to reach the calling party via a data communication path and/or a voice communications path where possible.

In another aspect, an embodiment of an emergency call failure mitigation apparatus is disclosed. The claimed apparatus comprises, inter alia, one or more processors and a network interface operative to receive a call signaling indication pursuant to an emergency service call from a calling party pertaining to an emergency situation that has failed to reach a PSAP (e.g., a local PSAP). One or more modules are operatively coupled to the processors, wherein the modules may be implemented as hardware and/or software modules having program instructions stored thereon, which, when executed by the one or more processors, are configured to: launch a messaging system, responsive to the call signaling indication, that is operative for prompting the calling party to provide one or more responses relating to the emergency situation; generate a messaging object including at least one of the calling party's location, identity of a call receiving device associated with the calling party, type of the calling party and priority of the emergency service call determined based on one or more responses of provided by the calling party; and forward the messaging object to an entity operative to reach the calling party.

In a further aspect, an embodiment of a non-transitory computer-readable medium containing instructions stored thereon is disclosed for performing one or more embodiments of the methods set forth herein. According to one implementation, the non-transitory computer-readable medium containing instructions may be executed by a computer system configured to operate as an apparatus in a communications network, wherein a messaging object is generated based on a "second chance" communication with an emergency caller after the caller's emergency call has failed to reach a PSAP. The messaging object may include data related to at least one of the calling party's location, identity of a call receiving device associated with the calling party, type of the calling party and priority of the emergency service call determined based on one or more responses of provided by the calling party, and the like, which messaging object may be forwarded to one or more entities operative to reach the calling party. In one variation, the messaging object may comprise an email message including a rendition of voice responses provided by the calling party, one or more video files, text files, graphic files, photo images uploaded by the calling party and capabilities of the call receiving device. In still further embodiments, a virtualized implementation of the foregoing architecture is disclosed.

Benefits of the present invention include, but not limited to, providing an embodiment that advantageously facilitates a "failover" process when an emergency service call fails for some reason, thereby overcoming one or more shortcomings of the existing technologies. For example, the existing techniques/technologies do not notify anyone of a network issue directly in the event of an emergency call failure, not to mention not being able to provide any assistance to the caller in a case where the caller was only able to attempt a call just once. In times of distress, poor communications connections, and/or battery utilization, the one call may be the only call that the caller is able to make. After that, the caller's window of opportunity may be gone. Another issue that comes into play when the caller cannot get through is whether the caller is the party needing assistance, or a bystander reporting an incident that requires assistance. Emergency situations such as large highway accidents can lead to multiple callers reporting the same accident, and they tie up all of the resources available for completing the calls or tie up all of the personnel available to answer the calls. Returning unanswered calls can tie up resources and personnel for hours after the event when the intent or needs of the caller are unknown. It should be appreciated that embodiments disclosed herein overcome all such issues in a beneficial manner.

In addition to giving a "second chance" to emergency callers, embodiments herein also allow for failure tracking and monitoring that may be utilized by network operators and other third-party entities to isolate and troubleshoot network issues causing such failures. As government entities continue to place higher service requirements on emergency calls, such capabilities are particularly valuable in the context of evolving network standards and technologies. Further features of the various embodiments are as claimed in the dependent claims. Additional benefits and advantages of the embodiments will be apparent in view of the following description and accompanying Figures.

LIST OF ABBREVIATIONS AND ACRONYMS

Set forth below is a list of abbreviations and acronyms that may be relevant with respect to one or more embodiments of the present patent disclosure.

AGPS: Assisted Global Positioning System—a pre-referenced satellite based location system that can generate a location fix in a shorter amount of time with a higher level of accuracy than what is possible with standard GPS.

ALI: Automatic Location Identification—a database that contains information about the location of a telephone number or a specialized 10-digit routing key.

ANI: Automatic Number Identification—a database containing information about a piece of communications equipment based on the telephone number assigned to the handset or communications equipment.

CPE: Customer Premises Equipment—Communications Equipment utilized for call setup at the destination end of an Emergency Call. Usually known as the PSAP CPE.

CDMA: Code Division Multiple Access—a communications technology used in wireless communications networks.

E-CSCF: Emergency—Call Session Control Function.

ESInet: Emergency Services IP Network.

ESN: Emergency Services Number—a key/field in the ALI database record that associates to an Emergency Services Zone for routing calls to a PSAP.

ESQK: Emergency Services Query Key—a ten digit number assigned to reference the routing required for a Wireless, VoIP, or Over the Top (OTT) emergency (9-1-1) call. The key is also used by the Public Safety Agency to query location databases for information about the caller's location and contact information.

ESRD: Emergency Services Routing Digits.

ESRK: Emergency Services Routing Key—a ten digit number assigned to reference the routing required for a Wireless, VoIP, or Over the Top emergency (9-1-1) call. The key is also used by the Public Safety Agency to query location databases for information about the caller's location and contact information.

ESRP: Emergency Services Routing Proxy.

ESZ: Emergency Services Zone—an assigned service zone or jurisdiction that is assigned to a PSAP for call routing.

GMLC: Gateway Mobile Location Center—a system used to route emergency (9-1-1) calls to the appropriate Public Safety Answering Point as well as populate the updated location information for mobile callers that the Public Safety Answering Point queries from the ALI Database.

GPS: Global Positioning System.

GSM: Global System for Mobile—a communications technology used in wireless communications networks.

IMS: Internet Protocol Multimedia Subsystem.

LRF: Location Retrieval Function.

LS: Location Server.

LTE: Long Term Evolution—a telecommunications technology used for data transmission on wireless telecommunications networks.

MGW: Media Gateway—a call control system utilized for call setup in an IMS communications Network.

MPC: Mobile Positioning System—a system used to route emergency (9-1-1) calls to the appropriate Public Safety Answering Point as well as populate the updated location information for mobile callers that the Public Safety Answering Point queries from the ALI.

MSC: Mobile Switching Center—the system that sets up communication paths between mobile devices like cellular telephones and other communication devices, e.g., both fixed and mobile devices.

MP3: MPEG Audio Layer-3 Compression Standard for file storage.

MPEG: Moving Picture Experts Group standards body.

NOC: Network Operations Center.

NENA: the National Emergency Number Association.

P-CSCF: Proxy—Call Session Control Function.

pANI: Pseudo Automatic Location Information—a ten digit number used to reference a mobile or VoIP device in the same way that a 10-digit number is used to reference a fixed wireline phone. Also known as an ESRK or ESQK.

PSAP: Public Safety Answering Point—a call taking dispatch center for Emergency First Responders.

PDE: Position Determining Entity—a system that utilizes wireless communications radio frequency and Global Positioning Satellites to locate a wireless communications device anywhere on the globe.

SIP: Session Initiation Protocol—a TCP/IP based communications protocol used to set up communication paths utilizing shared data links to determine the route and availability of the party at the other end before establishing a dedicated voice trunk.

SS7: Signaling System 7—a proprietary communications protocol used to set up communication paths utilizing shared data links to determine the route and availability of the party at the other end before establishing a dedicated voice trunk.

TCP/IP: Transmission Control Protocol/Internet Protocol—a protocol used to communicate over packet-switched networks, most notably, the Internet.

VoIP/VOIP: Voice over Internet Protocol.

VoLTE: Voice over LTE—Voice communication utilizing the Long Term Evolution technology on wireless networks.

VPC: VoIP Positioning Center—a system used to associate a location with a communications device utilizing the Voice over Internet Protocol.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 10A/10B illustrate connectivity between network devices (NDs) within an exemplary network, as well as three exemplary implementations of the NDs, according to some embodiments of the invention wherein at least a portion of a network shown in FIG. 5 and FIGS. 6A-6C may be implemented in a virtualized environment.

DETAILED DESCRIPTION OF THE DRAWINGS

Figure 1:
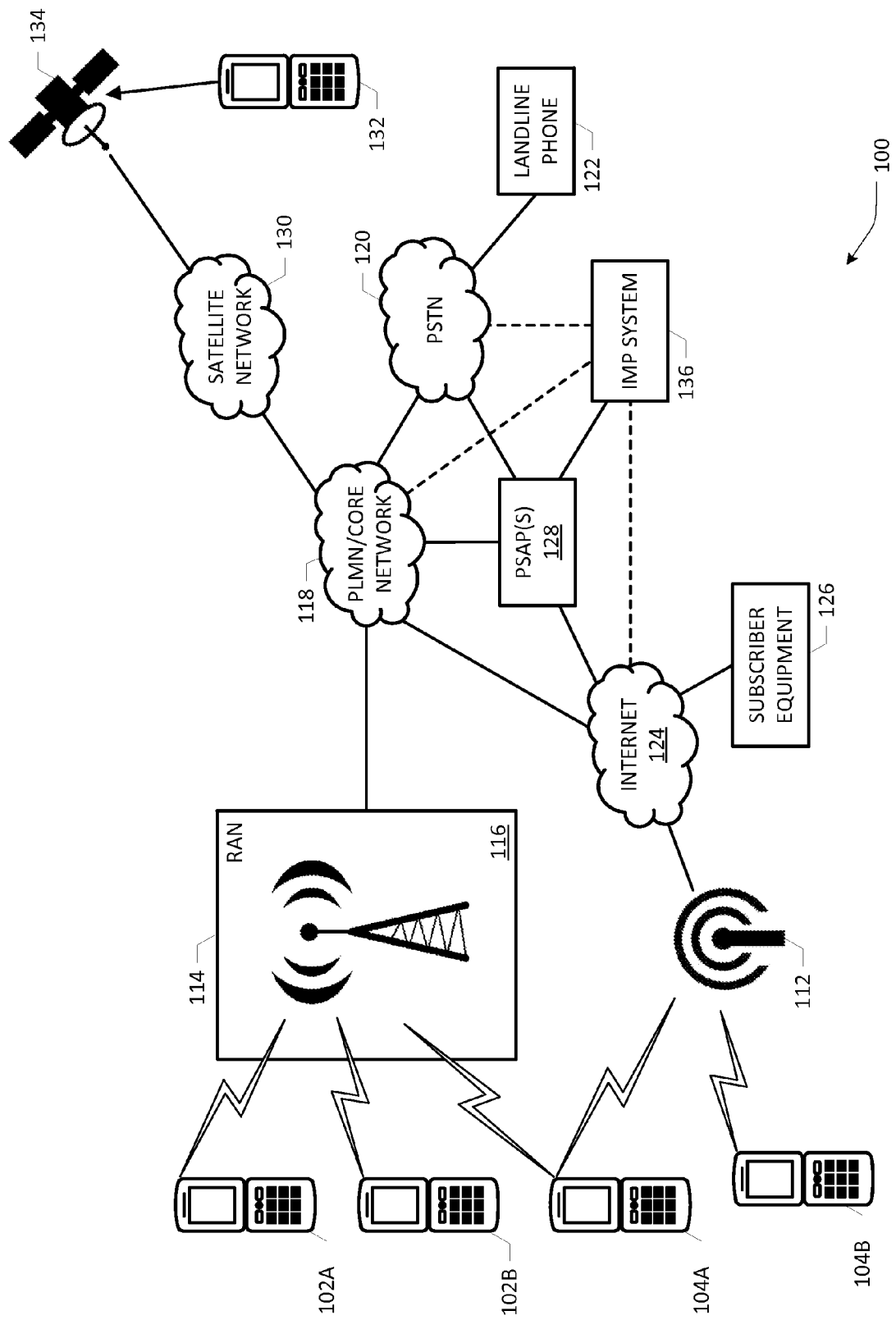
FIG. 1 depicts an example emergency call service network architecture involving one or more communications networks wherein an embodiment of the present patent application may be practiced for mitigating an emergency call failure.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that one or more embodiments of the present disclosure may be practiced without such specific components-based details. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices (e.g., an end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such electronic devices may typically include a set of one or more processors coupled to one or more other components, such as one or more storage devices (non-transitory machine-readable storage media), user input/output devices (e.g., a keyboard, a touch screen, a pointing device, and/or a display), and network connections. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device may be configured to store code and/or data for execution on one or more processors of that electronic device for purposes of implementing one or more techniques of the present disclosure.

Turning now to FIG. 1, depicted therein is an example emergency call service network architecture 100 involving one or more communications networks wherein an embodiment of the present patent application may be practiced for mitigating an emergency call failure. As one skilled in the art will appreciate, an emergency service call (e.g., based on a single number dialing system like "911" or "112"; hereinafter more generically referred to as 9-1-1 calls regardless of the numbering conventions used in different geographic regions or countries) may be generated by a caller or calling party, including a human or a piece of equipment operating on behalf of a human operator, using a vast array of devices or subscriber equipment in conjunction with myriad technologies that may involve wireline communications, short-range and/or long-range wireless communications, satellite phone communications, Internet Protocol (IP)-based communications, and the like. Such devices and subscriber equipment (sometimes also referred to as user equipment (UE) devices, end-user equipment, or communication endpoints or subscriber stations, etc.) may comprise landline Public-Switched Telephony Network (PSTN) phones, single-mode/dual-mode/multi-mode wireless mobile communications devices operating in one or more wireless technologies involving IEEE 802.11b, IEEE 802.11a, IEEE 802.11g, HiperLan and HiperLan II standards, Wi-Max standard, OpenAir standard, Bluetooth standard, etc. as well as wide area cellular communication technologies such as General Packet Radio Service (GPRS) network technologies, Enhanced Data Rates for Global System for Mobile Communications (GSM) Evolution (EDGE) network technologies, 3rd Generation Partnership Project (3GPP)-compliant network technologies, Integrated Digital Enhanced Network (IDEN) technologies, various types of Code Division Multiple Access (CDMA) network technologies, Time Division Multiple Access (TDMA) and Frequency Division Multiple Access (FDMA) network technologies, Universal Mobile Telecommunications System (UMTS) network technologies, Universal Terrestrial Radio Access Network (UTRAN) technologies, etc. Furthermore, the subscriber equipment may comprise IP-compliant portable communication devices such as smartphones, personal digital assistants (PDAs), laptops, palm tops, tablets, phablets, personal computers, Voice Over Internet Protocol (VOIP) phones, OTT phones/services, GPS units, portable gaming devices or consoles, portable media players, multimedia phones, etc., some of which may run emergency service call applications, e.g., within a social media application, that can access public packet-switched networks (e.g., the Internet) via various access technologies. Accordingly, at least some of the subscriber devices or user equipment (UE) devices may be operative to generate emergency service calls in an network operative with technologies such as all-IP Next Generation Network (NGN) technology, Next Generation 9-1-1 (NG911) technology, IP Multimedia Subsystem (IMS) technology, etc. It should be understood that whereas IMS is defined by the 3GPP standards body which mainly addresses GSM networks, another group, 3GPP2, is involved in defining a closely analogous architecture referred to as Multimedia Domain (MMD). MMD is essentially an IMS for CDMA networks, and since MMD and IMS are roughly equivalent, the term "IMS" may be used in this present patent disclosure to refer collectively to both IMS and MMD where applicable. In addition, fixed network standards for NGN (Next Generation Networks) that are based on and/or reuse IMS are also being developed by bodies such as ETSI TISPAN, Cablelabs and the ITU-T. NGN and IMS are roughly equivalent, and accordingly the term "IMS" may also be used in this present patent disclosure to refer collectively to both IMS and NGN where applicable.

By way of illustration, accordingly, various communications devices such as mobile communications devices 102A, 102B operative with one or more suitable radio access network infrastructures (e.g., RAN 114 including one or more base transceiver stations BTS 116) coupled to corresponding Public Land Mobile Network (PLMN) core networks 118, corded/cordless landline phones 122 operative with suitable PSTN 120, satellite phones 132 operative with satellite communications network infrastructure components 134, 130, as well as IP-based subscriber equipment 126 and dual-mode communications devices 104A, 104B operative with both short-range radio communications networks (e.g., as exemplified by WiFi hotspots, pico cells or femto cells 112) and wide-area cellular access networks such as RAN 114 are illustratively shown in the emergency call service network environment 100. Furthermore, although not explicitly illustrated in FIG. 1, it should be appreciated that emergency service calls may also be made using OTT phones, public payphones, vehicular-based communications devices (e.g., on-board car phones, marine radios, etc.) as well as specialized communications equipment such as telecommunications for the deaf (TDD devices), teletypewriters (TTY devices), textphones, etc.

Depending on the implementation and/or network interfacing capabilities, one or more PSAPs 128 may be configured to be in communicative relationship with various types of networks, e.g., PLMN 118, PSTN 120 and/or Internet 124, for servicing emergency service calls that may emanate from callers or calling parties using any type of subscriber equipment described above. Such PSAPs may be disposed in local, regional or national networks, and may be configured as call centers responsible for answering calls and dispatching appropriate first responders (e.g., police, firefighting, ambulance personnel, etc.) to the locations of emergency scenarios or situations. Each PSAP may have a regular E.164 number that is called when the emergency number (i.e., 9-1-1) is dialed, such that when a 9-1-1 call is placed, it may be routed to a suitable PSAP (often the nearest to the call origination location) based on suitable call switching techniques implemented in a parent communications network. An integrated messaging platform or subsystem (IMP subsystem) 136 operative to be coupled to any type of communications network such as those described above may be invoked when there is an emergency call failure, e.g., an emergency service call does not reach a PSAP for some reason, in accordance with one or more embodiments of the present invention set forth in detail hereinbelow.

Figure 2:
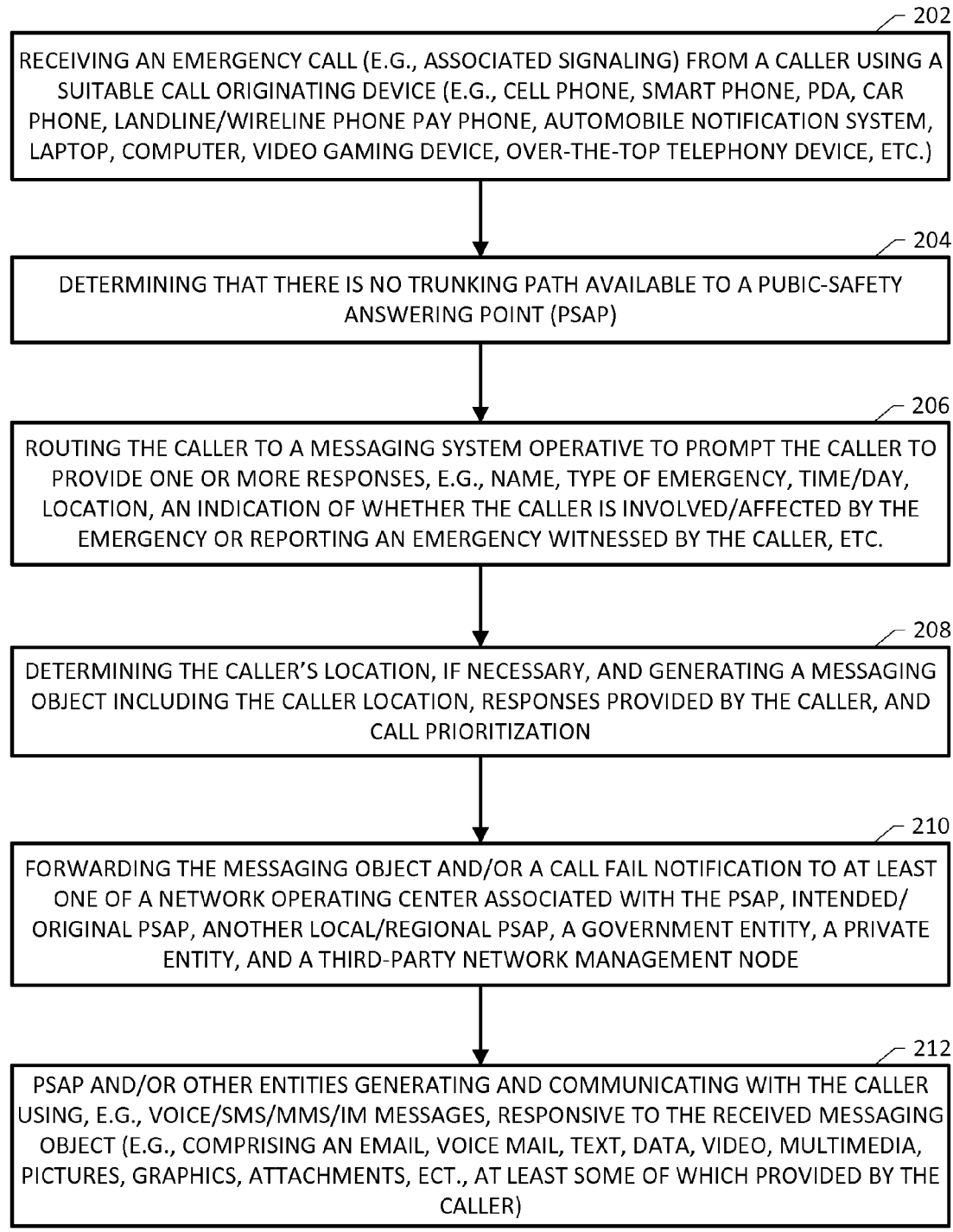
FIG. 2 depicts a flowchart of various blocks, steps, acts and functions that may take place in an emergency call failure mitigation scheme according to an embodiment.

FIG. 2 depicts a flowchart of various blocks, steps, acts and functions that may take place in an emergency call failure mitigation scheme according to an embodiment implemented in at least a portion of the network environment 100. At block 202, an emergency service call is received from a caller or calling party (e.g., associated signaling) using a suitable call originating device with respect to an emergency situation. As one skilled in the art will recognize upon reference hereto, an emergency situation for purposes of the present patent disclosure may comprise a broad range of situations, scenarios, conditions, settings, circumstances, etc. including but not limited to power outages, utilities outages and other grid infrastructure failures, potential or actual criminal activities including terrorist activities, explosions, fires, floods or natural disasters, roadside accidents, highway emergencies, hazardous material (hazmat) spillages, radiological, biochemical and biological accidents and threats, as well as personal emergencies such as life-threatening situations, medical emergencies, and the like, in addition to less aggravated settings involving domestic pet rescues, and the like. Appropriate service logic executing at a relevant network element is operative to determine that there is no voice trunking path available to a PSAP, e.g., a local PSAP, with respect to the incoming emergency service call (block 204), which may be due to physical infrastructure issues, network congestion, etc. In one example embodiment, such service logic may try to reach more than one PSAP, e.g., depending on call origination location, before determining that voice trunking is not available for any of the attempted PSAPs. Responsive thereto, suitable call setup/signaling messages may be generated to a messaging system whereby the calling party is routed thereto, the messaging system being operative to prompt the calling party to provide one or more responses, e.g., name, type/nature of emergency situation, time/day information, location of the emergency situation, indication of whether the calling party is actually involved in or otherwise afflicted by the emergency rather than simply reporting it, type/capabilities of the calling party's call originating subscriber equipment or some other call receiving equipment (e.g., associated with a callback number), and the like (block 206). In one implementation, the calling party may be prompted in an interactive manner, e.g., using questions similar to those normally provided by a human operator at a PSAP according to established local emergency responder methodologies, procedures and protocols. As a further variation, the interactive prompting session may be effectuated by an automated agent that may be an expert system based on technologies such as, e.g., artificial intelligence (AI), adaptive learning, pattern recognition, voice robotics, neural networks, and the like. In a still further embodiment, such interactive prompting sessions may be effectuated as or via OTT communications (voice/data/video), including services but not limited to Skype, FaceTime, Bobsled, Tango, Oovoo video chats, etc. Depending on the technology and subscriber equipment involved, the calling party's location may also be determined or otherwise ascertained separately (e.g., based on a geolocation system or other satellite-positioning system). Also, one or more messaging objects may be generated including, e.g., at least one or the calling party's location, identity/capabilities of a call receiving device associated with the calling party, type/nature of the emergency situation as well as a priority indication of the emergency service call determined based on one or more responses provided by the calling party, etc., as set forth at block 208. In an example implementation, the messaging object may comprise an email message, SMS, or MMS message, including a text rendition of the voice responses provided by the calling party as well as any video files, text files, graphics, photo images, etc. that may have been uploaded by the calling party pertaining to the emergency situation. In accordance with the teachings herein, at least a call failure notification message operative to indicate that an emergency service call has failed and/or one or more messaging object(s) may be forwarded to one or more entities operative to reach the calling party via a communication path that may or may not involve a voice communication path (block 210). For example, such call failure notification messages, messaging objects, or both, may be provided to the local PSAP as well as the local switch or carrier network operating center associated with the local PSAP (e.g., the PSAP to which a voice trunk path was unavailable) and/or other PSAPs (e.g., remote PSAPs). Additionally or alternatively, the call failure notification message(s) and messaging objects may be forwarded to local, regional or national government or quasi-government entities including known first responder entities, third-party network management operators, private entities such as hospitals and other emergency service providers, and the like. One or more of the entities receiving the call failure notification message(s) and/or messaging objects may communicate with the calling party using a variety of communications including text messaging, e.g., Short Message Service (SMS), Multimedia Messaging Service (MMS), Instant Messaging (IM), etc. in addition to voice messaging where possible (block 212).

One skilled in the art should appreciate that an example embodiment of the foregoing scheme may be advantageously configured to leverage a variety of capabilities and technologies in order to utilize them to resolve a significant issue with regard to emergency call routing, especially where there may be mass emergency call failures over a widespread area in a rapidly escalating situation. By providing certain network components and communications protocols for call setup, voice messaging, and emergency call data delivery and management, and integrating them into an example embodiment as set forth herein, it is possible to provide a failover process that can be tracked, verified, trended, reported, and in rare cases forwarded to another PSAP entity. As governmental agencies in various countries (e.g., the FCC in the U.S.) may expect and/or require a far greater level of service for emergency calls, an example embodiment of the foregoing scheme advantageously provides a "second chance" for emergency callers, in addition to providing communications providers a means of tracking every failed emergency call that might have been caused by a physical or logical network issue.

Additional details with respect to further example embodiments will be set forth immediately below, first broadly describing features pertaining to a generalized emergency call scenario covering both wireline call processing as well as wireless/VOIP call processing scenarios. When an emergency service call is initiated through a single number dialing system, e.g., "911" or "112" or any other equivalent numbering, the criteria for call setup may be gathered by network entities such as the local switch, Tandem/Selective Router, and the PSAP CPE for standard wireline based calling, or the Mobile Switching Center (MSC), Mobile Positioning Center (MPC) or Gateway Mobile Location Center (GMLC), Tandem/Selective Router, and the PSAP CPE for wireless communications utilizing CDMA or GSM communications technologies, or Media Gateway (MGW), Proxy—Call Session Control Function (P-CSCF), Emergency—Call Session Control Function (E-CSCF), Location Retrieval Function (LRF), Location Server (LS), Emergency Services IP Network (ESInet), PSAP CPE for IMS based calling. All of the above listed systems may be configured to function by utilizing internal database tables, or by querying other network elements for routing instructions. In such cases, the call setup may be confirmed over a data network before voice trunking is assigned. If for some reason the call cannot be established, an embodiment of the present invention may be configured to generate suitable failure notification e.g., including a failure code, back to the local switch, the MSC, or the MGW.

When suitable failure code messages and/or notifications are received, the calls may be routed as noted above to an embodiment of an intelligent/integrated messaging platform (IMP), which in one example implementation may query the callers by asking a list of questions that can be responded to via voice, by pressing an associated key, or by selecting appropriate options in one or more pull-down menus. The information gained form the caller via voice may then be placed into an MP3 or other audio data file type for use later. In camera-activated queries, suitable images, photos, video files, etc. may also be captured responsive to the caller response inputs and selections. The intelligent/integrated messaging platform may also be configured to query one or more databases and elements that may normally be utilized by the PSAP during an emergency call. The IMP node may further be configured to query an Automatic Location Identification (ALI) database for static data associated with wireline networks, the MPC via ALI mobile location data, GMLC via ALI mobile location data, or LRF for the caller's location information depending on the parent network type (i.e., the type of communication network being utilized by the caller for originating the emergency service call). In one example implementation, such queries may be made simultaneously with the voice-based transactions while the voice circuit is still being held open. If the parent network is a CDMA Network, the MSC may query the ALI node for the geographic area serviced by the network, and the ALI node may query the MPC for an initial location. After a select amount of time (e.g., 20 to 30 seconds), the IMP node or subsystem may need to query the ALI Node again to gain or obtain an updated Location for the caller. If the parent network is a GSM network, the MSC may query the ALI node for the geographic area serviced by the network, and the ALI node may query the GMLC for an initial location. If the parent network is an IMS network, the IMP subsystem may query the Location Retrieval Function (LRF) to gain an initial location from the Location Server (LS). In one implementation, the data gained from the network nodes and/or the IMP may be placed within the body of an email message as noted previously, providing the same information that a PSAP operator would receive on their CPE display panels. In an additional implementation, an application may also be configured to provide mapping information (e.g., the latitude and longitude coordinates delivered with wireless caller data) as a further embodiment. The MP3 or other audio/video file(s) gained from the transactions with the caller may also be attached to the same email message, which may be sent to the PSAP where the call failed to be routed. Since data and voice often utilize different physical resources, the email or text message with attachments may be able to be delivered in a case where voice communications are currently unavailable. Also, a routing table may be built to tie an email address to the destination agency. For wireless calls, it should be appreciated that this process can be done in an example implementation based on various pieces of data, e.g., the Emergency Services Routing Key (ESRK), Emergency Services Query Key (ESQK), Emergency Services Routing Digits (ESRD) or pseudo-Automatic Location Information (pANI). Such 10-digit numbers may be assigned for delivery to specific PSAPs with known physical locations, mailing addresses and email addresses. Substantially similar processes may also be implemented for VoIP callers, mutatis mutandis, if they are utilizing a VoIP Positioning Center that assigns ESQKs to calls in the same way that an MPC or GMLC does for wireless calls. If the caller is a standard wireline caller, appropriate fields in the ALI data records may be configured for associating a PSAP/email address to be used for routing. In similar fashion, it should be noted that the Emergency Services Number (ESN) in an ALI database record for each wireline telephone number corresponds with an Emergency Services Zone (ESZ), wherein different ESZs correspond to different PSAP jurisdictional boundaries. Accordingly, such information may also be configured for call routing according to an embodiment of the present invention. Furthermore, at least part of the same information may be used to associate a PSAP's email address to the email being sent for a 9-1-1 caller whose voice call has failed to connect all of the way through to the PSAP. The email message may be sent to a Network Operations Center (NOC) for the communications provider, and/or any other associated third-party provider that is designated by the communications provider, as previously described. Having all of the parties involved with routing and establishing the call on the same email may therefore provide valuable research data to all parties to resolve the issues causing the original emergency service call to fail. As part of the communications involved in the process, the PSAP may also reply to the rest of the entities that the email was received and acted upon. Trending reports can also be built of off the call failures to make sure that developing issues like insufficient trunking (e.g., due to a large volume of emergency calls) are resolved before they become much larger problems. Additionally, appropriate priority-based heuristics and policies may be configured for triaging call failures relative to different types of emergency calls (e.g., higher priority being assigned to an emergency call originated by an actual victim of a road accident versus lower priority being assigned to a 9-1-1 caller simply reporting the same road accident as an observer or witness).

Figure 3A:
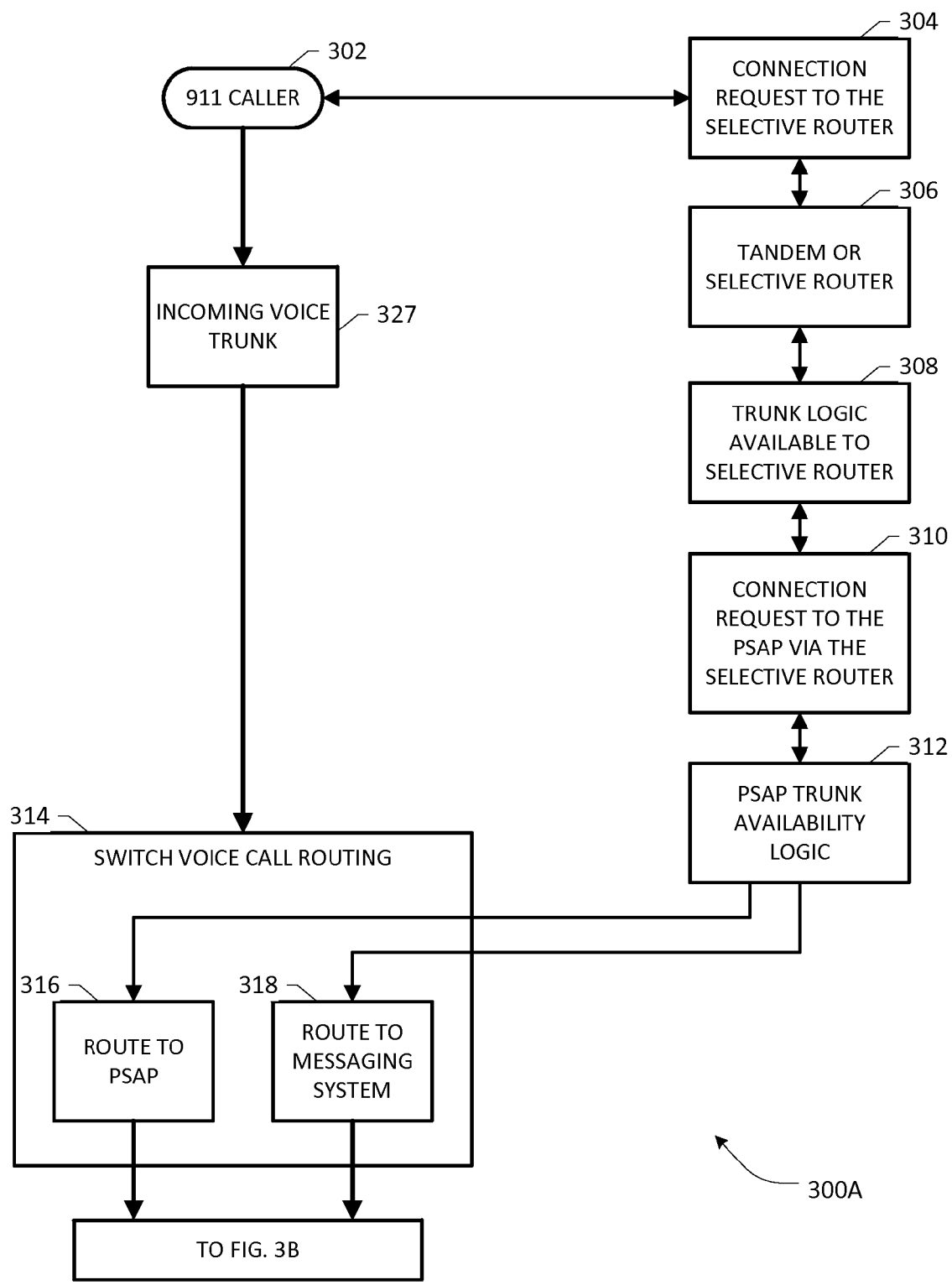
FIGS. 3A and 3B depict various blocks of an example network architecture configured to implement emergency call failure mitigation according to one embodiment.
Figure 3B:
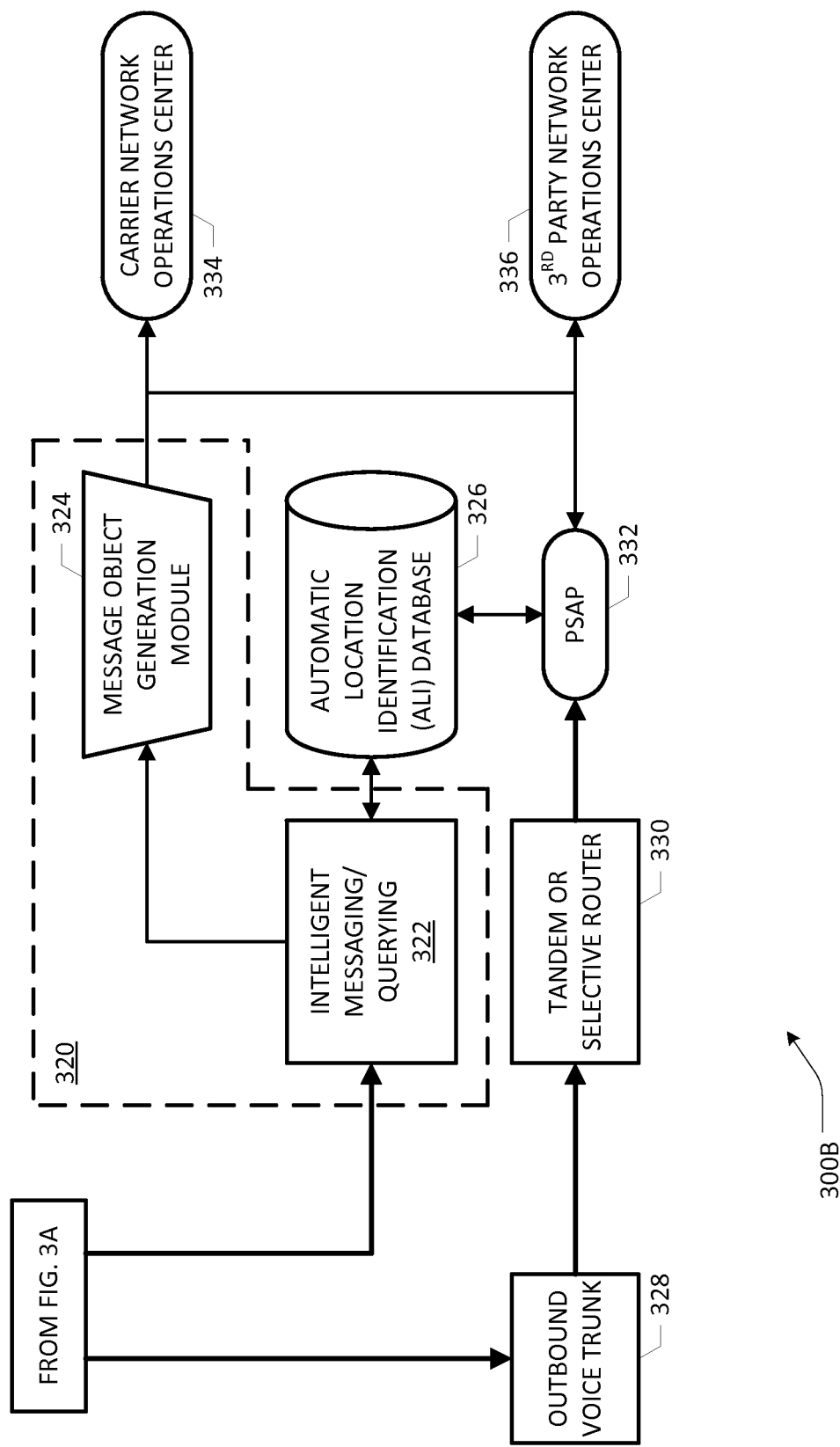
Figure 4A:
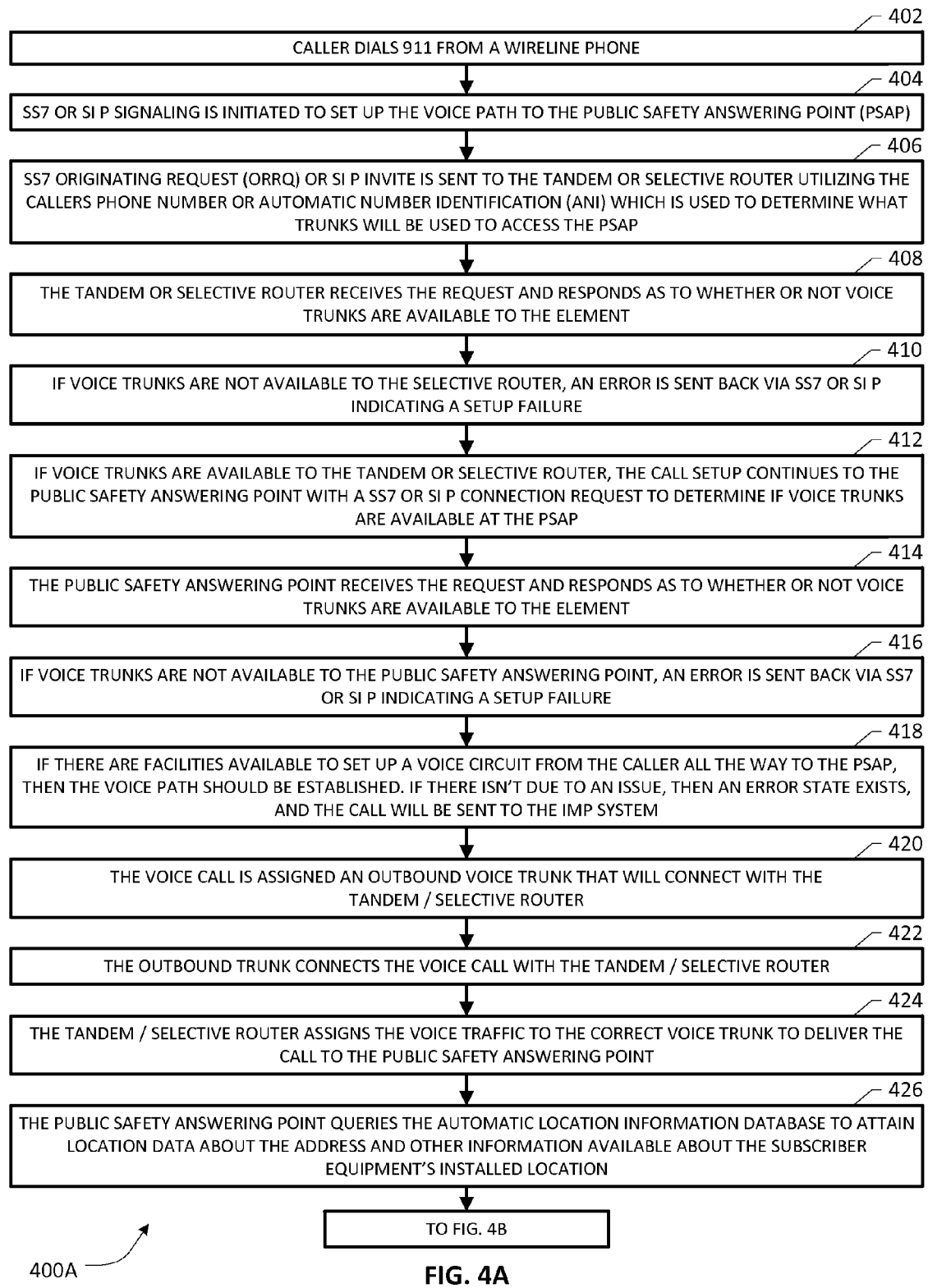
FIGS. 4A and 4B depict a flowchart of an emergency call failure mitigation scheme operative in the example network architecture of FIGS. 3A and 3B.
Figure 4B:
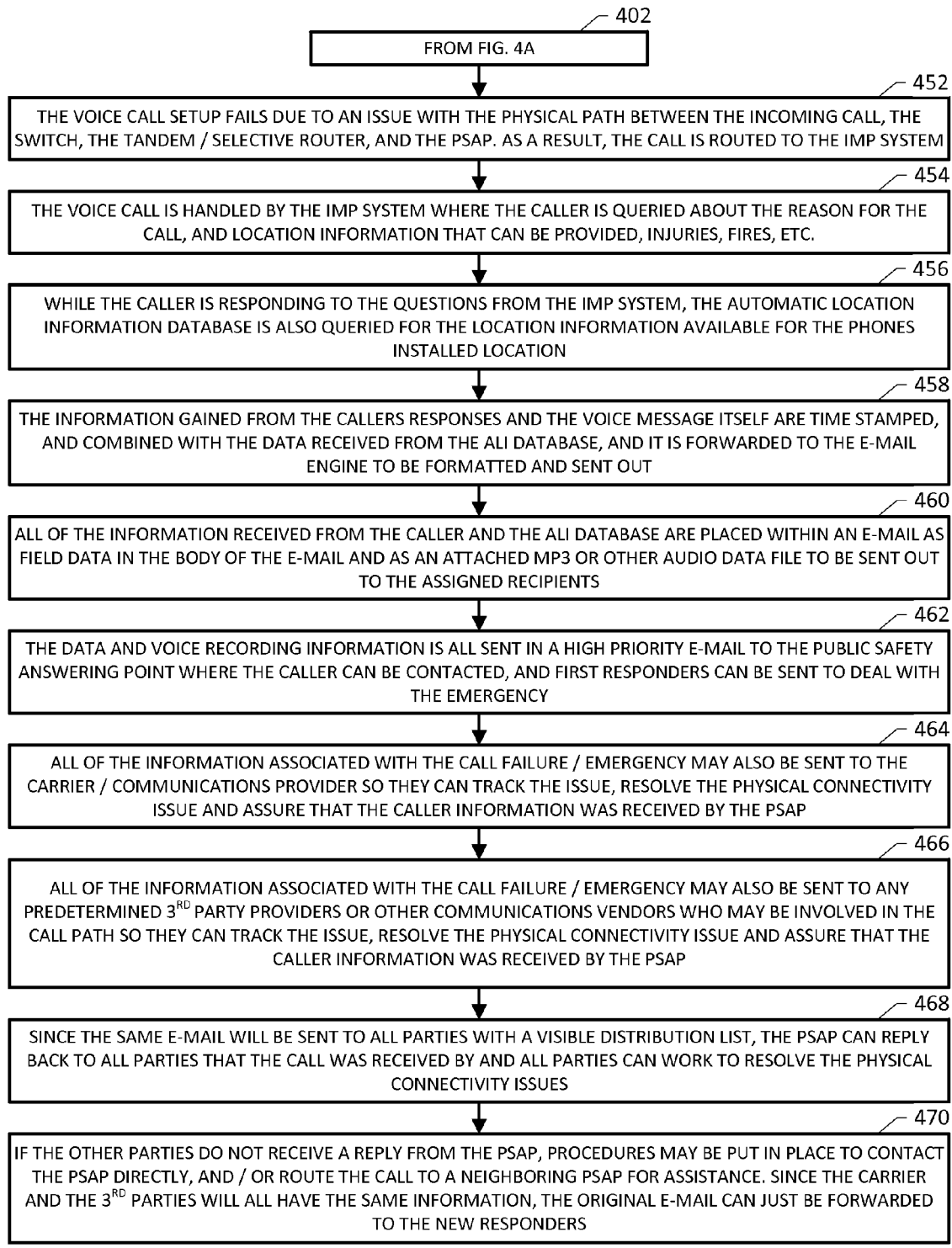

Turning to FIGS. 3A and 3B, depicted therein are various blocks of an example network architecture 300A/300B configured to implement emergency call failure mitigation in a wireline call processing scenario according to one embodiment. FIGS. 4A and 4B depict a flowchart of an emergency call failure mitigation scheme 400A/400B operative in the example network architecture of FIGS. 3A and 3B. Taking FIGS. 3A/3B and 4A/4B together, it should be appreciated that whereas a local switch infrastructure 300A may be responsible for at least a portion of the emergency call mitigation scheme 400A/400B, the remainder of the emergency call mitigation scheme 400A/400B may be implemented, executed or otherwise performed in an off-switch infrastructure 300B that may be configured to include an IMP subsystem 320 operative according to an embodiment of the present invention. An emergency service caller 302 disposed in a wireline network environment, e.g., a 9-1-1 caller operating via a PSTN, is operative to place a 9-1-1 call (block 402). Appropriate call setup signaling (e.g., SS7 or SIP signaling) may be initiated to set up the voice path to a local PSAP (block 404), pursuant to which a connection request 304 may be transmitted to a Selective Router that is operative to select a suitable destination PSAP for the 9-1-1 call based on the location associated with the caller's ANI. As set forth at block 406, an SS7 Origination Request (ORREQ) or a SIP INVITE may be sent to a Tandem or Selective Router 306. Appropriate service logic 308 executing at or in connection with Tandem or Selective Router 306 is operative responsive to the received request and respond as to whether or not voice trunks are available (block 408). If the voice trunks are available to the Selective Router 306, the call setup continues to the PSAP via a connection request 310 in order to determine if voice trunks are available thereat (block 412). Otherwise, an error may be sent back via SS7 or SIP signaling to indicate a call setup failure (block 410). Suitable logic 312 at the PSAP is operative responsive to the received connection request and respond whether voice trunking is available (block 414). As before, if there are no trunking paths to the PSAP, an error may be sent back via SS7 or SIP signaling to indicate a call setup failure (block 416). If there are facilities available to set up a voice circuit from the caller all the way to the PSAP, then a voice path to the PSAP may be established normally. Otherwise, in addition to the error message(s) as set forth at block 416, appropriate call setup signaling may be provided to the off-switch IMP subsystem 320, as set forth at block 418. A voice call routing block 314 is therefore operative to switch the call routing accordingly via a PSAP routing block 316 or an IMP routing block 318. An outbound voice trunk is 328 may be provided to the Tandem or Select Router 306 if a voice circuit can be established to the PSAP 332 with respect to incoming voice trunk 327, as set forth at blocks 420, 422, 424, whereupon the PSAP 322 is operative to query an ALI database 326 to attain, ascertain, determine or otherwise obtain location data about the calling party's address and other information available regarding the subscriber equipment's installed location (block 426). As noted previously, if the emergency call setup encounters a failure involving any of the infrastructure elements, the incoming call is routed to the IMP subsystem (block 452) instead via the call route switching block 314, whereupon a voice circuit between the calling party 302 and the IMP subsystem 320 is established. As set forth at block 454, appropriate service logic 322 executing as part of the IMP subsystem 320 is operative to query the caller about the emergency situation, e.g., reason for the call, location information, injury information, fire/flood/natural disaster information, etc. that may be relevant to the particular emergency. In one implementation, while the caller is responding to the queries from the IMP querying logic 322, the ALI database 326 may also be interrogated for the location information, etc., available for the subscriber equipment's installed location (block 456). The information gathered from the caller's responses and the voice messages may be time-stamped and combined with the data retrieved from the ALI database 326, which may be forwarded to a message object generation module or engine 324 to be formatted appropriately and transmitted based on applicable network interfaces to the assigned recipients, e.g., local PSAP, other PSAPs, network operator nodes, etc. (blocks 458, 460). As noted previously, such messaging object data may be sent as a priority email to the PSAP 332 where the caller can be contacted, and whereby relevant first responders may be dispatched to deal with the emergency situation (block 462). Additionally or alternatively, at least part of the information associated with the call failure and/or emergency situation may also be forwarded to the carrier NOC 334 as well as any predetermined third-party providers or other communications vendors/operators 336 that may be involved in the call path so that they can track the failure, resolve the physical connectivity issues, and ensure that the caller information was received by PSAP 332, as set forth at blocks 464, 466. Where the messaging object(s) were sent to a number of recipient parties including PSAP 332, the PSAP may be configured to reply back to the rest of the parties indicating that the messaging object was received and direct the parties to resolve the issue as needed (block 468). Additionally or alternatively, if the other parties do not receive a reply from PSAP 332, a further option may involve installing suitable procedures to contact the PSAP directly, and/or route the call to a neighboring PSAP for assistance, whereupon new responders may receive the relevant information (block 470).

Figure 8:
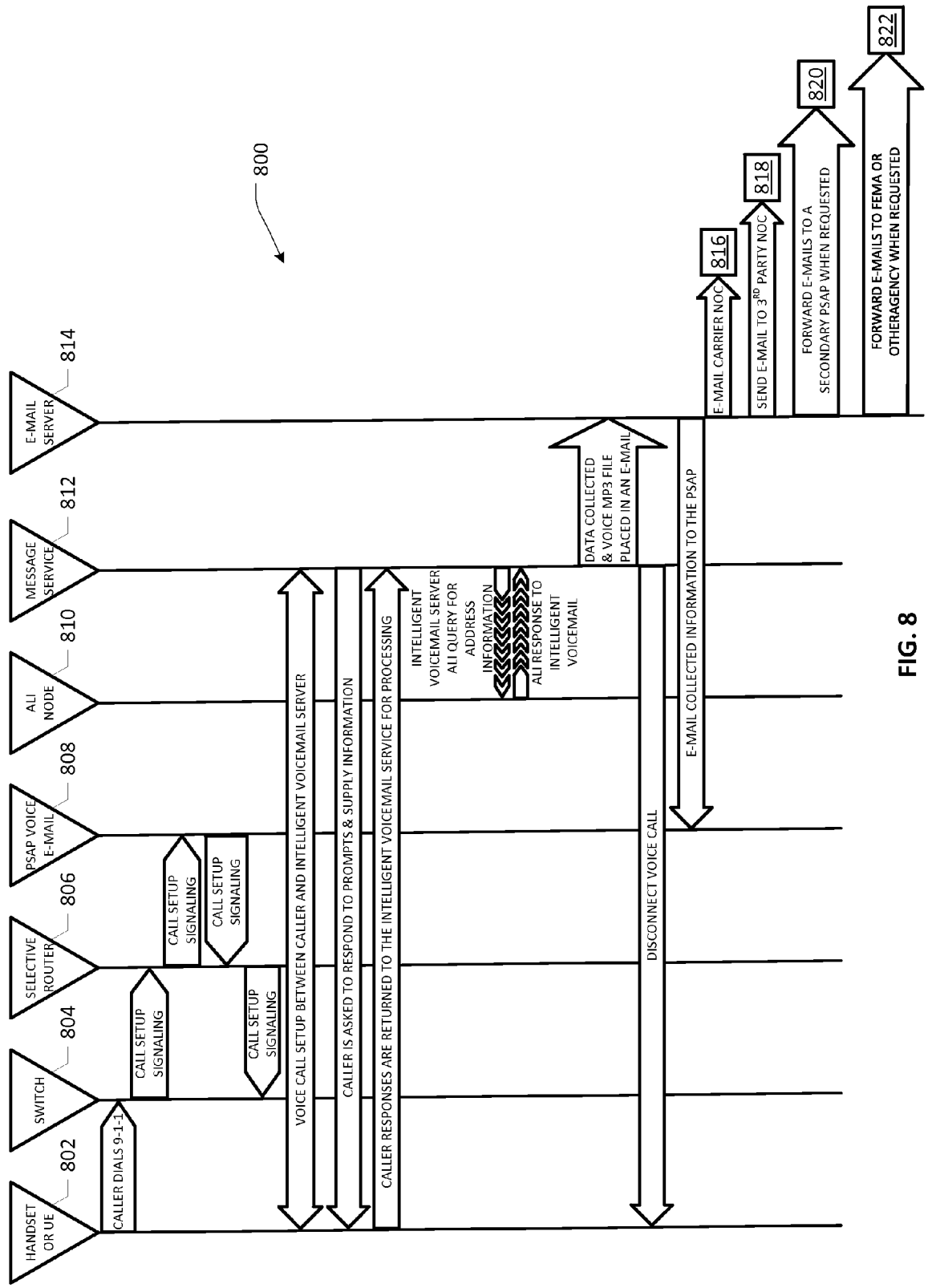
FIG. 8 depicts a message flow diagram with respect to an emergency call failure mitigation scheme corresponding to the embodiment of FIGS. 3A/3B and FIGS. 4A/4B.

FIG. 8 depicts a message flow diagram 800 with respect to an emergency call failure mitigation scheme corresponding to a particular example implementation of the embodiment of FIGS. 3A/3B and FIGS. 4A/4B set forth above. By way of illustration, message flows involving a wireline UE or handset 802, a landline telephony switch 804, Selective Router 806, primary PSAP (and associated messaging) 808, ALI 810 and IMP system 812 are shown for effectuating at least a portion of the steps and acts described previously. An email server 814 is operatively provided as a message integration or message object generation element for generating appropriate email messages to one or more entities, e.g., carrier NOC 816, third-party NOC 818, secondary/tertiary PSAPs 820 as well as a governmental entity 822 such as Federal Emergency Management Agency or FEMA in the U.S.

Figure 5:
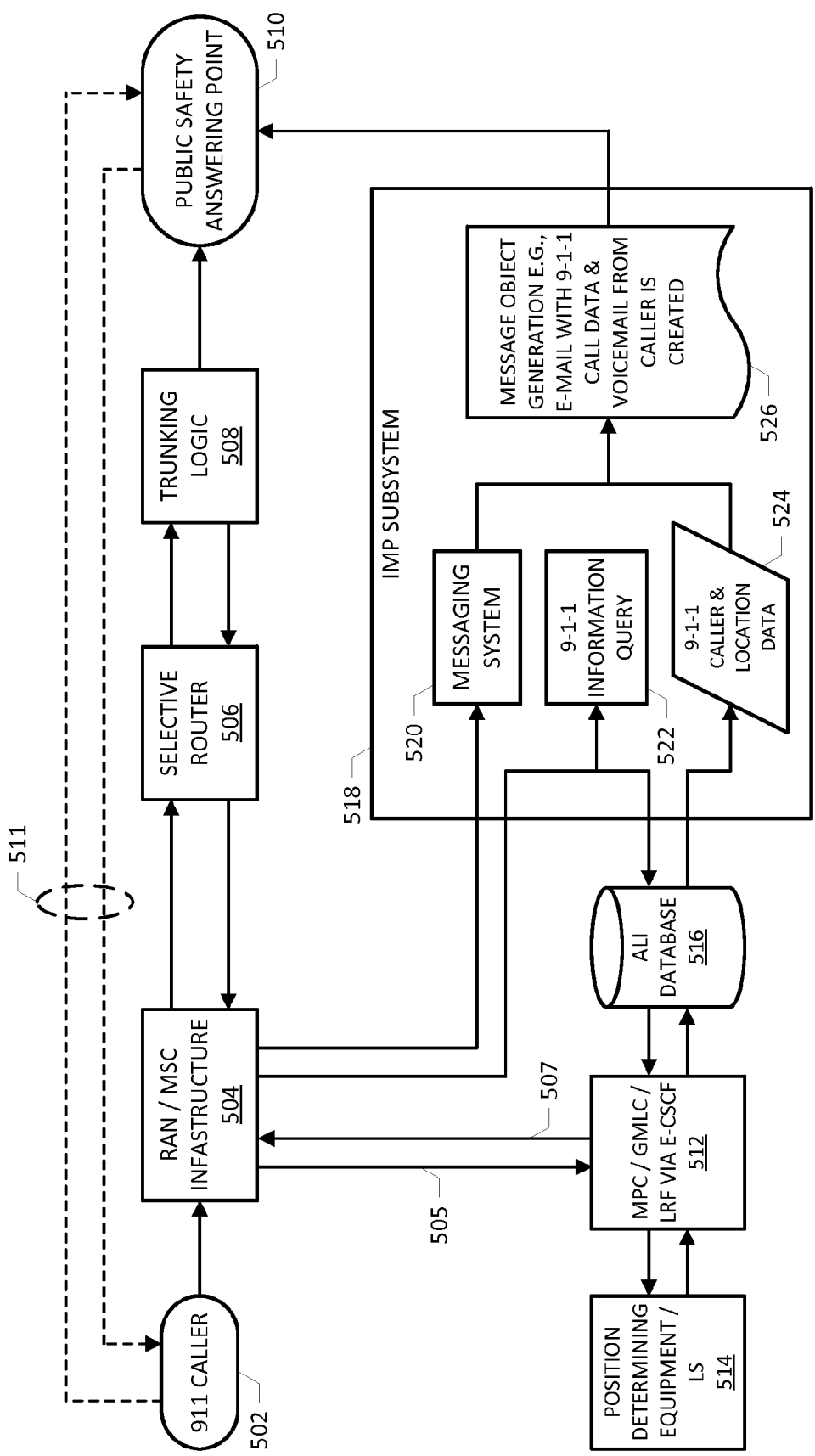
FIG. 5 depicts various blocks of another example network architecture configured to implement emergency call failure mitigation according to one embodiment.
Figure 6A:
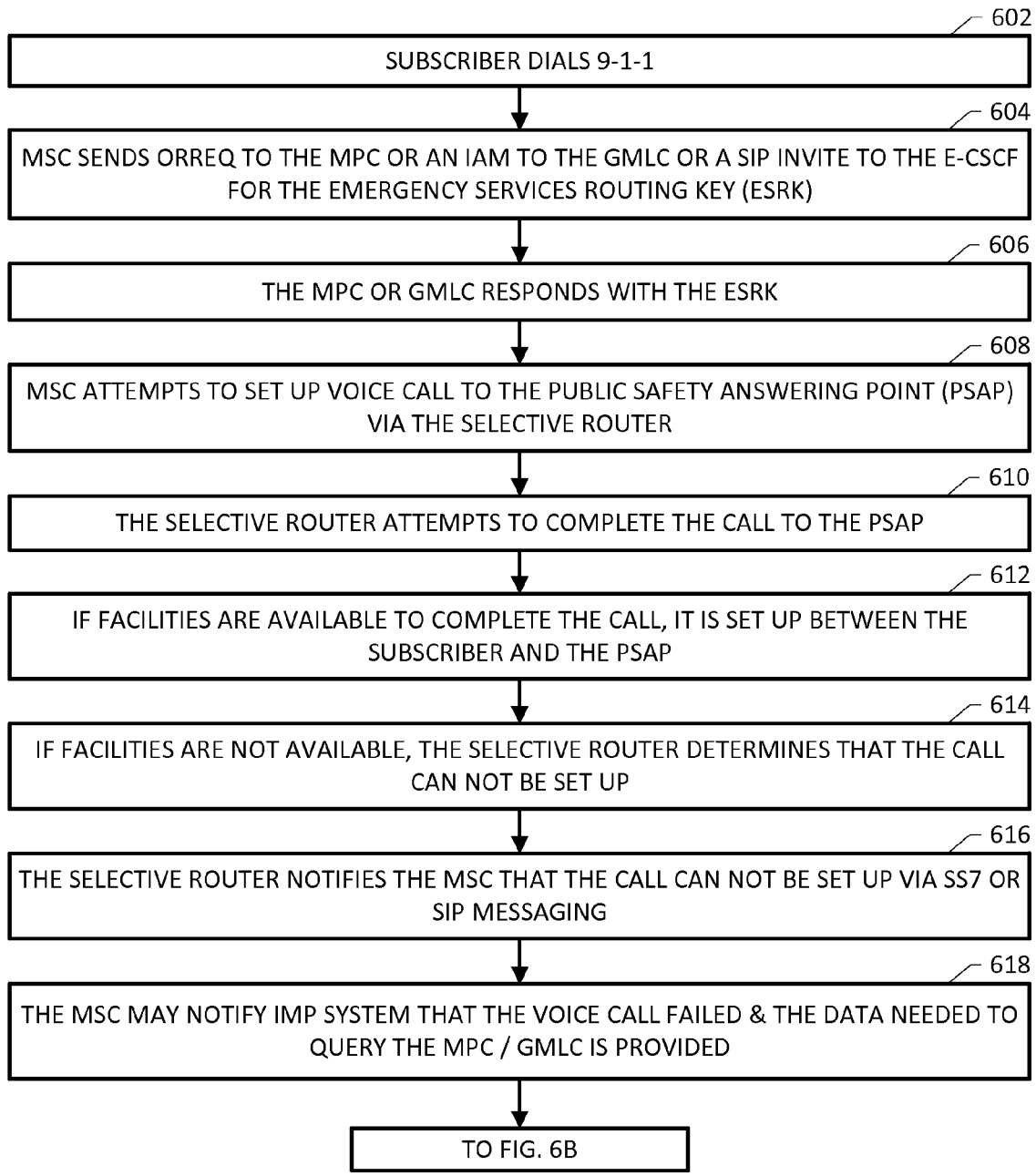
FIGS. 6A-6C depict a flowchart of an emergency call failure mitigation scheme operative in the example network architecture of FIG. 5.
Figure 6B:
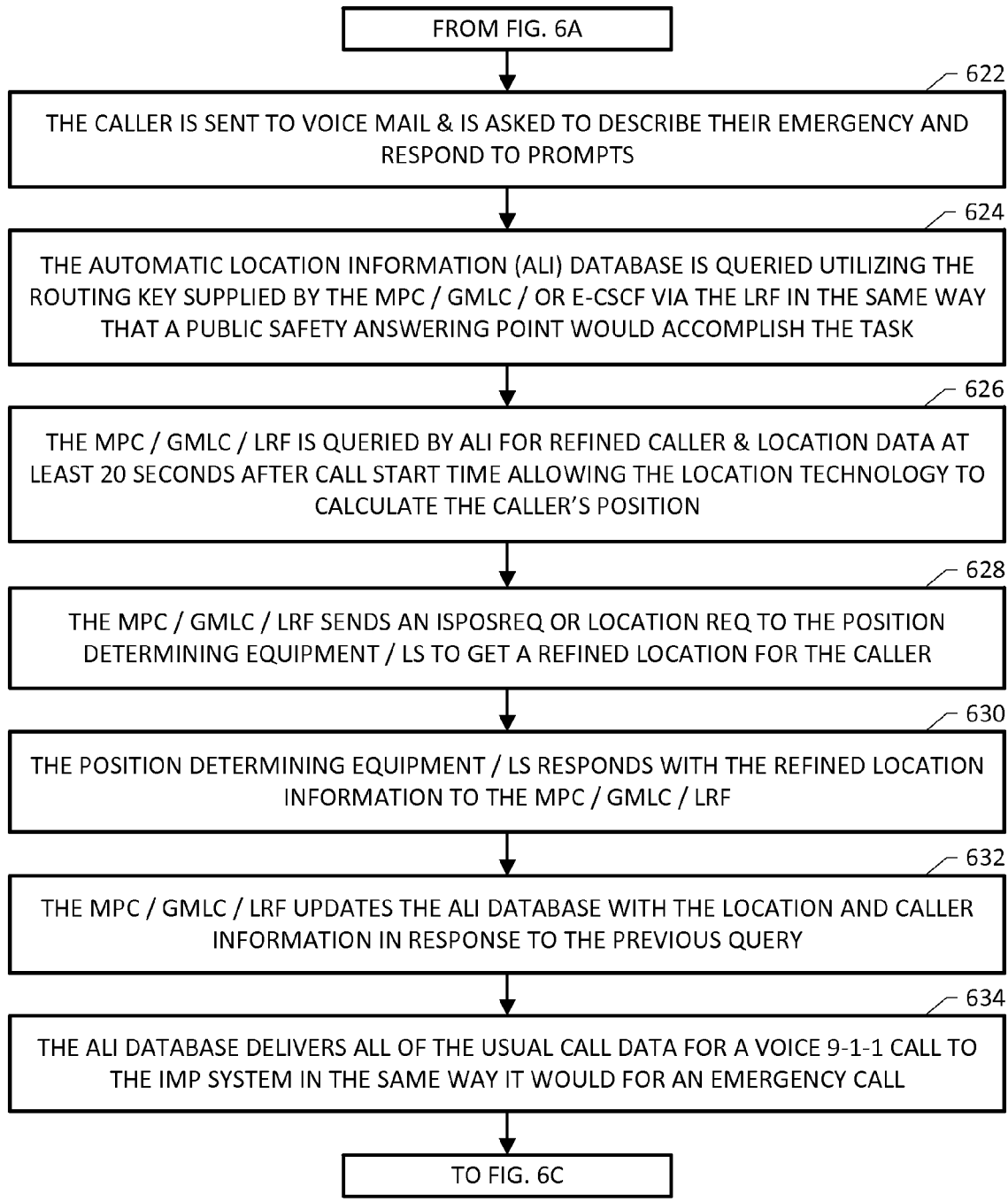
Figure 6C:
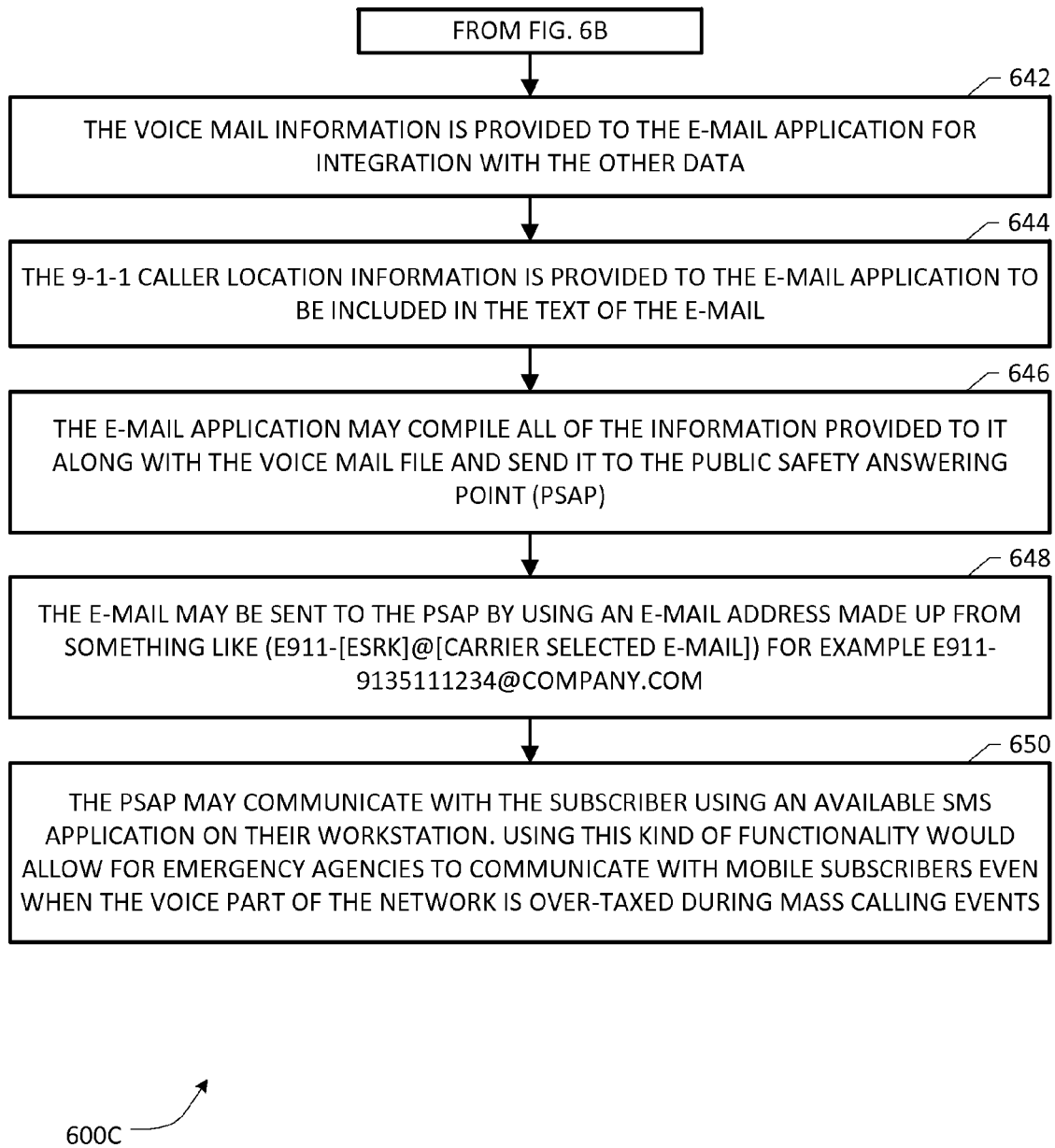

FIG. 5 depicts various blocks of another example network architecture 500 configured to implement emergency call failure mitigation in a wireless/VOIP call processing scenario according to one embodiment of the present patent disclosure. FIGS. 6A-6C depict a flowchart of an emergency call failure mitigation scheme 600A-600C operative in the example network architecture 500 of FIG. 5. Taking FIGS. 5 and 6A-6C together, it should be appreciated that an implementation of the emergency call failure mitigation scheme set forth therein may involve off-board routing or switching at least with respect to location determination as part of a call setup process. An emergency service caller 502 operating suitable subscriber equipment (e.g., a wireless phone) is operative to initiate a 9-1-1 call (block 602), which is received at an appropriate network element, e.g., a serving MSC (either home MSC or a visiting MSC, if roaming), via suitable RAN infrastructure, collectively shown as RAN/MSC infrastructure 504. As set forth at block 604, the MSC is operative to send a request message 505, e.g., an ORREQ to an MPC element, or an Initial Address Message (IAM) to a Gateway Mobile Location Center (GMLC) element, or a SIP INVITE to an E-CSCF node for obtaining the Emergency Services Routing Key (ESRK), which elements are collectively shown at reference numeral 512 in the example network architecture 500 of FIG. 5. Responsive to the request message 505, a response message 507 (e.g., an orreq or iam response message) containing the ESRK is received by the MSC node 504 (as set forth at block 606). A voice call setup using the ESRK is then attempted by MSC 504 to a PSAP 510 via a Selective Router element 506 executing trunking logic 508, as set forth at blocks (as set blocks 608-616). When the Selective Router element 506 attempts to complete the call to the PSAP 510 (at block 610), a determination is made whether facilities are available to complete the call. If so, a voice trunk is established between the 9-1-1 caller 502 and PSAP 510 (at block 612). Otherwise, the trunking logic 508 executing at Selective Router 506 is operative to determine that the call cannot be established (at block 614), whereupon a suitable notification or message is generated to MSC 504 from Selective Router 506

(at block 616). Responsive to the call failure message from Selective Router 506, MSC 504 is operative to generate a message or notification to a querying block or component 522 that forms at least a portion of an example IMP subsystem 518. As set forth at block 618, such a notification may comprise an indication that the voice call encountered a failure, along with the data needed to query the MPC/GMLC/E-CSCF infrastructure 512. Also, the 9-1-1 caller 502 is sent to a messaging block or element 520, which in an example implementation may comprise a sophisticated voicemail system, that is operative to query the caller for information pertaining to the emergency situation, as set forth at bock 622 in FIG. 6B. The querying logic block 522 is operative to query an ALI database 516 using the supplied routing key information, preferably in the same manner as would a PSAP (e.g., PSAP 510), as set forth at block 624. Responsive thereto, the MPC/GMLC/E-CSCF infrastructure 512 is queried by the ALI database 516 for refined caller location data, which in one implementation may take place at least after a predetermined amount of time has elapsed since the call start time (e.g., 20 seconds or more), thereby allowing a location system 514 to calculate or otherwise determine the caller's updated position (at block 626). The MPC/GMLC/E-CSCF infrastructure 512 is operative to send an Intersystem Position Request (ISPOSREQ) message or a LocationReq message to the location system or position determining equipment 514 to obtain refined caller location data (at blocks 628, 630). Responsive thereto, the MPC/GMLC/E-CSCF infrastructure 512 updates the location data in the ALI database 516, which forwards it along with the usual call data for a voice 9-1-1 to a caller location and data component 524 of the IMP subsystem 518, preferably in the same manner as it would for an emergency call (at block 634). Response information obtained by the messaging system 520 as well as the caller location data 524 is provided to a message object generation component 526, e.g., an email application operate to compile the received information into an email message to be transmitted to PSAP 510, as exemplified at blocks 642, 644, 646 of FIG. 6C. In an example implementation, the email message may be addressed based on a carrier-selected email format as illustrated at block 648. As noted previously, PSAP 510 may also communicate with the 9-1-1 subscriber using any available alternative communication paths 511 that may be effectuated by launching suitable applications, e.g., SMS text messaging applications or such as Twilio or Tropo, available at PSAP's equipment. It should be appreciated that this additional/alternative communications capability and functionality would allow emergency service agencies to communicate with subscribers even when the voice part of the network architecture 500 is over-taxed or otherwise down (block 650). Furthermore, a similar scheme may also be implemented in all-IP networks, IMS/MMS/NGN networks or satellite phone networks for handling emergency call failures.

Figure 9:
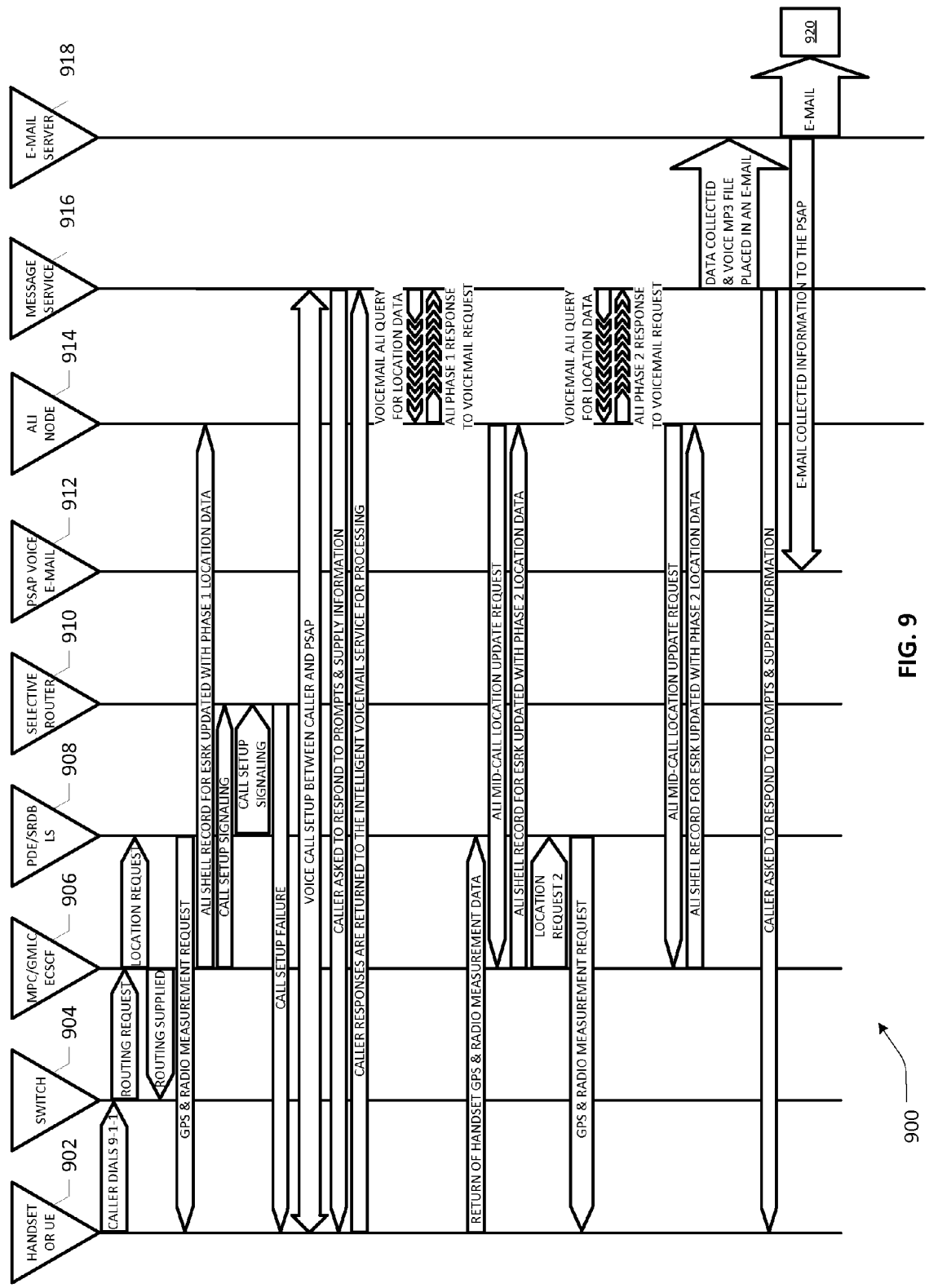
FIG. 9 depicts a message flow diagram with respect to an emergency call failure mitigation scheme corresponding to the embodiment of FIG. 5 and FIGS. 6A-6C.

Turning to FIG. 9, depicted therein is a message flow diagram 900 with respect to an emergency call failure mitigation scheme corresponding to a particular example implementation of the embodiment of FIG. 5 and FIGS. 6A-6C set forth above. By way of illustration, message flows involving a wireless UE or handset 902, a mobile telephony switch 904, applicable MPC/GMLC/E-CSCF elements 906, applicable PDE/SRDB (Selective Router Data Base)/LS elements 908, Selective Router 910, primary PSAP (and associated messaging) 912, ALI 914 and IMP system 916 are shown for effectuating at least a portion of the steps and acts described previously. Similar to the message flow diagram 800 of FIG. 8, an email server 918 is operatively provided as a message integration or message object generation element for generating appropriate email messages to one or more entities 920, cumulatively representative as a carrier NOC 920, third-party NOC 920, secondary/tertiary PSAPs 920 as well as one or more governmental entities 920 (e.g., FEMA), and the like.

Figure 7:
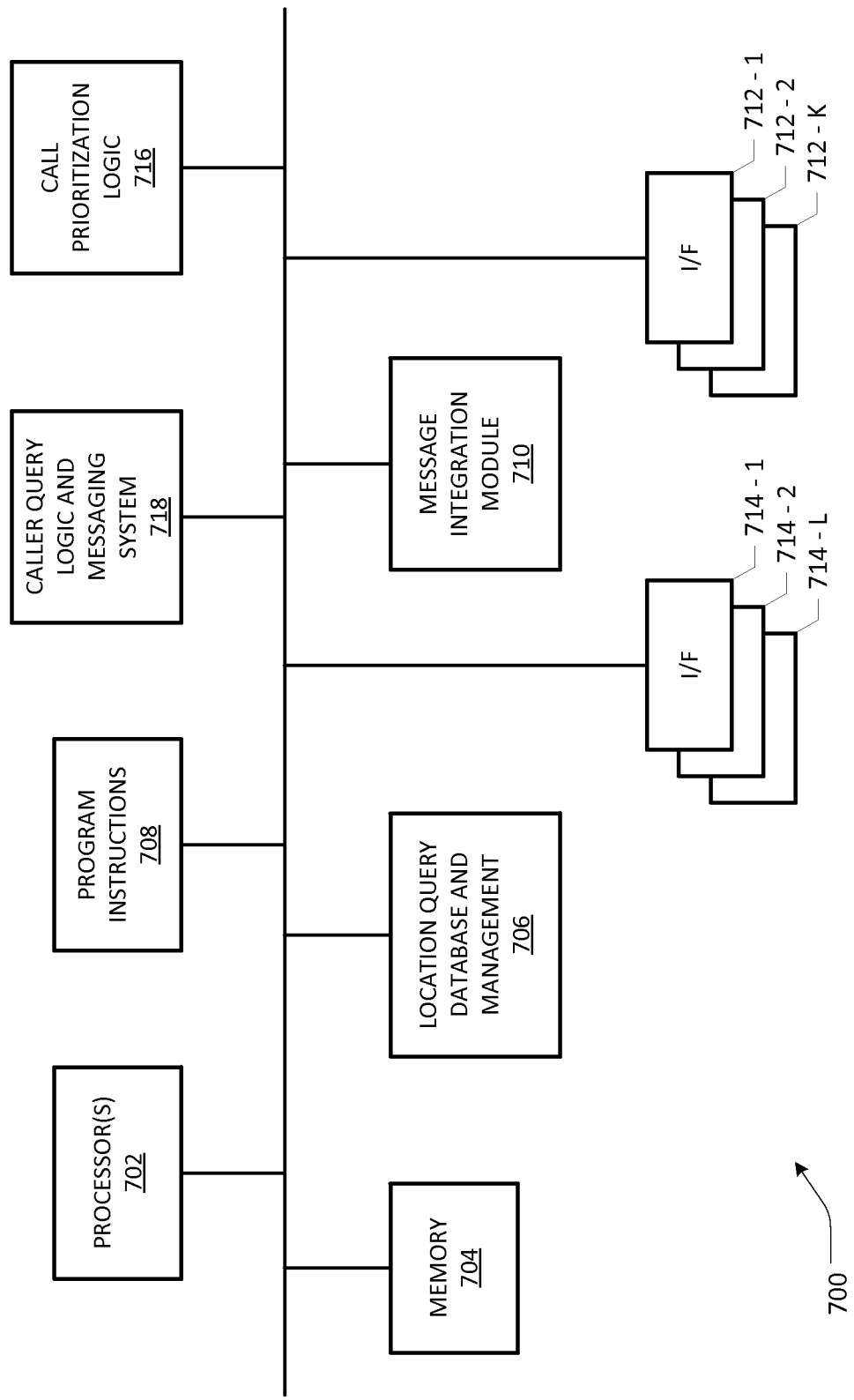
FIG. 7 depicts a block diagram of an apparatus, subsystem or one or more network components that may be configured to facilitate emergency call failure mitigation according to an embodiment of the present patent disclosure.

FIG. 7 depicts a block diagram of an apparatus, subsystem or one or more network components 700 that may be configured to facilitate emergency call failure mitigation according to an embodiment of the present patent disclosure. Depending on the implementation and/or network architecture of a parent communications network, apparatus 700 may be configured in different ways with suitable network interfaces, e.g., I/F 714-1 to 714-L, operative for effectuating communications with other network infrastructure elements and databases (for receiving call setup signaling failure notification messages, database query requests/responses, and the like, for instance), as well as interfaces 712-1 to 712-K for effectuating voice/data/multimedia communications with one or more subscribers whose emergency calls have failed. One or more processors 702 may be provided as part of a suitable computer architecture for providing overall control of the apparatus 700, which processor(s) 702 may be configured to execute various program instructions stored in appropriate memory modules or blocks, e.g., persistent memory 704 as well as program instructions 708, including additional modules or blocks specific to emergency call failure mitigation. By way of illustration, an integrated messaging module 718 may comprise suitable hardware and software components for querying emergency callers via configurable and situation-specific automated agents in connection with respective emergency scenarios and obtain responses accordingly using voice, data, and/or video communications. A 9-1-1 location querying module 706 is configured to query appropriate databases (e.g., ALI databases) for updated location information and other positional data relevant to the emergency callers and scenarios. A call prioritization logic module 716 is operative for applying a variety of heuristics-based decision-making processes in order to intelligently prioritize, screen, filter or otherwise manipulate the response data gathered with respect to the reported emergency scenarios. A message integration module 710 is operative for generating suitable message objects (e.g., email/SMS/MMS messages with attachments, photos, videos, etc.) based on the response data as well as any other related data relevant to the different emergency callers and scenarios. As noted before, such message objects may be provided to various PSAPs as well as carrier network entities and third-party entities via suitable interfaces.

In a further variation, the message integration module 710 may also comprise or be interfaced with a "Big Data" analytics platform to correlate the emergency caller response data with vast amounts of other information that may be available via various types of communications networks including but not limited to broadcast communications (e.g., radio, TV, etc.), the Internet, social media networks, etc. in order to generate message objects even more refined and/or enriched. For purposes of the present application, "Big Data" may be used as a term for a collection of data sets so large and complex that it becomes virtually impossible to process using conventional database management tools or traditional data processing applications in a scalable manner. Challenges involving Big Data may include capture, curation, storage, search, sharing, transfer, analysis, and visualization, etc. Especially where there are mass failures with respect to emergency calls, Big Data analytics may be particularly suitable with respect to generating proper message objects depending on the number of emergency subscribers, complexity/congestion of the parent networks involved, geographic area(s) covered by the mitigation system, and the like.

One skilled in the art will further recognize that various apparatuses, subsystems, functionalities/applications and/or one or more network elements as well as the underlying network infrastructures set forth above for facilitating an emergency call failure mitigation scheme may be architected in a virtualized environment according to a network function virtualization (NFV) architecture in additional or alternative embodiments of the present patent disclosure. For instance, various physical resources, services, applications and functions executing within an example network, e.g., network architecture 300A/300B (in FIGS. 3A/3B) or network architecture 500 (in FIG. 5) including subsystem 700, may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Furthermore, at least a portion of an example network architecture disclosed herein may be virtualized as set forth above and architected in a cloud-computing environment comprising a shared pool of configurable virtual resources. Various pieces of software, e.g., call processing software, call failure mitigation software, etc., as well as platforms and infrastructure of a network may be implemented in a service-oriented architecture, e.g., Software as a Service (SaaS), Platform as a Service (PaaS), infrastructure as a Service (IaaS) etc., with involved parties providing different features of an example embodiment of the present invention. Skilled artisans will also appreciate that such a cloud-computing environment may comprise one or more of private clouds, public clouds, hybrid clouds, community clouds, distributed clouds, multiclouds and interclouds (e.g., "cloud of clouds", and the like. Set forth below are some example embodiments relative to emergency call failure mitigation in the context of a virtualization/cloud architecture described above.

In the examples herein, a network device (ND) may be an electronic device that communicatively interconnects other electronic devices on the network (e.g., other network devices, end-user devices). Some network devices may be configured as "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

FIG. 10A illustrates connectivity among a plurality of network devices (NDs) within an exemplary network, as well as three exemplary implementations of the NDs, according to some embodiments of the invention. In particular, FIG. 10A shows NDs 1000A-H, which may be representative of PSAPs, third-party NOCs, governmental infrastructure elements, carrier network switching elements, access network elements, Selective Routers, ALI/Location Databases, MGWs, MPC/GMLC/E-CSCF nodes, IMP subsystems, and the like, wherein example connectivity is illustrated by way of lines between A-B, B-C, C-D, D-E, E-F, F-G, and A-G, as well as between H and each of A, C, D, and G. As noted previously, such NDs may be provided as physical devices, and the connectivity between these NDs can be wireless or wired (often referred to as a link). An additional line extending from NDs 1000A, E, and F illustrates that these NDs act as ingress and egress nodes for the network (and thus, these NDs are sometimes referred to as edge NDs; while the other NDs may be called core NDs).

Two of the exemplary ND implementations in FIG. 10A are: (1) a special-purpose network device 1002 that uses custom application-specific integrated-circuits (ASICs) and a proprietary operating system (OS); and (2) a general purpose network device 1004 that uses common off-the-shelf (COTS) processors and a standard OS.

The special-purpose network device 1002 includes appropriate hardware 1010 (e.g., custom or application-specific hardware) comprising compute resource(s) 1012 (which typically include a set of one or more processors), forwarding resource(s) 1014 (which typically include one or more ASICs and/or network processors), and physical network interfaces (NIs) 1016 (sometimes called physical ports), as well as non-transitory machine readable storage media 1018 having stored therein suitable application-specific software or program instructions 1020 (e.g., switching, routing, call processing, etc). A physical NI is hardware in an ND through which a network connection (e.g., wirelessly through a wireless network interface controller (WNIC) or through plugging in a cable to a physical port connected to a network interface controller (NIC)) is made, such as those shown by the connectivity between NDs 1000A-H. During operation, the application software 1020 may be executed by the hardware 1010 to instantiate a set of one or more application-specific or custom software instance(s) 1022. Each of the custom software instance(s) 1022, and that part of the hardware 1010 that executes that application software instance (be it hardware dedicated to that application software instance and/or time slices of hardware temporally shared by that application software instance with others of the application software instance(s) 1022), form a separate virtual network element 1030A-R. Each of the virtual network element(s) (VNEs) 1030A-R includes a control communication and configuration module 1032A-R (sometimes referred to as a local control module or control communication module) and forwarding table(s) 1034A-R with respect to suitable application/service instances 1033A-R, such that a given virtual network element (e.g., 1030A) includes the control communication and configuration module (e.g., 1032A), a set of one or more forwarding table(s) (e.g., 1034A), and that portion of the application hardware 1010 that executes the virtual network element (e.g., 1030A) for supporting the application instance 1033A (e.g., emergency call routing, call prioritization, caller query logic and integrated messaging, and the like in relation to an IMP subsystem virtualization).

In an example implementation, the special-purpose network device 1002 is often physically and/or logically considered to include: (1) a ND control plane 1024 (sometimes referred to as a control plane) comprising the compute resource(s) 1012 that execute the control communication and configuration module(s) 1032A-R; and (2) a ND forwarding plane 1026 (sometimes referred to as a forwarding plane, a data plane, or a media plane) comprising the forwarding resource(s) 1014 that utilize the forwarding or destination table(s) 1034A-R and the physical NIs 1016. By way of example, where the ND is an IMP subsystem node, the ND control plane 1024 (the compute resource(s) 1012 executing the control communication and configuration module(s) 1032A-R) is typically responsible for participating in controlling how bearer traffic (e.g., voice/data/video) is to be routed. Likewise, ND forwarding plane 1026 is responsible for receiving that data on the physical NIs 1016 (e.g., I/Fs 714-1 to 714-L or I/Fs 712-1 to 712-K) and forwarding that data out the appropriate ones of the physical NIs 1016 based on the forwarding information.

FIG. 10B illustrates an exemplary way to implement the special-purpose network device 1002 according to some embodiments of the invention, wherein an example special-purpose network device includes one or more cards 1038 (typically hot pluggable) coupled to an interconnect mechanism. While in some embodiments the cards 1038 are of two types (one or more that operate as the ND forwarding plane 1026 (sometimes called line cards), and one or more that operate to implement the ND control plane 1024 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1036 (e.g., a first full mesh coupling the line cards and a second full mesh coupling all of the cards).

Returning to FIG. 10A, the general purpose network device 1004 includes hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein software 1050, e.g., general purpose operating system software, similar to the embodiments set forth above in reference to FIG. 7 in one example. During operation, the processor(s) 1042 execute the software 1050 to instantiate one or more sets of one or more applications 1064A-R with respect to facilitating emergency call failure mitigation. While one embodiment does not implement virtualization, alternative embodiments may use different forms of virtualization— represented by a virtualization layer 1054 and software containers 1062A-R. For example, one such alternative embodiment implements operating system-level virtualization, in which case the virtualization layer 1054 represents the kernel of an operating system (or a shim executing on a base operating system) that allows for the creation of multiple software containers 1062A-R that may each be used to execute one of the sets of applications 1064A-R. In this embodiment, the multiple software containers 1062A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: (1) the virtualization layer 1054 represents a hypervisor (sometimes referred to as a virtual machine monitor (VMM)) or a hypervisor executing on top of a host operating system; and (2) the software containers 1062A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 1064A-R, as well as the virtualization layer 1054 and software containers 1062A-R if implemented, are collectively referred to as software instance(s) 1052. Each set of applications 1064A-R, corresponding software container 1062A-R if implemented, and that part of the hardware 1040 that executes them (be it hardware dedicated to that execution and/or time slices of hardware temporally shared by software containers 1062A-R), forms a separate virtual network element(s) 1060A-R.

The virtual network element(s) 1060A-R perform similar functionality to the virtual network element(s) 1030A-R— e.g., similar to the control communication and configuration module(s) 1032A and forwarding table(s) 1034A (this virtualization of the hardware 1040 is sometimes referred to as NFV architecture, as mentioned above. Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 1062A-R differently. For example, while embodiments of the invention may be practiced in an arrangement wherein each software container 1062A-R corresponds to one VNE 1060A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 1062A-R to VNEs also apply to embodiments where such a finer level of granularity is used.

In certain embodiments, the virtualization layer 1054 includes a virtual switch that provides similar forwarding services as a physical Ethernet switch. Specifically, this virtual switch forwards traffic between software containers 1062A-R and the NIC(s) 1044, as well as optionally between the software containers 1062A-R. In addition, this virtual switch may enforce network isolation between the VNEs 560A-R that by policy are not permitted to communicate with each other (e.g., by honoring virtual local area networks (VLANs)).

The third exemplary ND implementation in FIG. 10B is a hybrid network device 1006, which includes both custom ASICs/proprietary OS and COTS processors/standard OS in a single ND or a single card within an ND. In certain embodiments of such a hybrid network device, a platform VM (i.e., a VM that implements the functionality of the special-purpose network device 1002) could provide for para-virtualization to the application-specific hardware present in the hybrid network device 1006 for effectuating a particular emergency call failure mitigation scheme.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1030A-R, VNEs 1060A-R, and those in the hybrid network device 1006) receives data on the physical NIs (e.g., 1016, 1046) and forwards that data out the appropriate ones of the physical NIs (e.g., 1016, 1046).

Based upon the foregoing Detailed Description, it should be appreciated that embodiments of the present disclosure provide an integrated emergency call failure mitigation scheme based a number of communications standards, technologies and functionalities such as Joint ATIS/TIA Standards, Telecommunications Switch Operations, Mobile Switching Center Operations, IMS Network Operations, Voice Mail and Visual Voice Mail, Spatial Location Mapping, GPS, AGPS, Voice Over IP, Voice Over LTE, TCP/IP, E-mail, MPEG Audio/Video File Creation, and the like. Advantages of the present invention can be particularly appreciated in the context of the following. If an emergency call is never established between the switching equipment and the PSAP, there is no way for a system at the destination end of the call to collect the data. Since the IMP system in an example embodiment may be disposed at the initiating switch, it already has a connection to the caller and valuable information can be collected. The email/SMS/MMS/video objects generated by an embodiment of the present invention can contain information that may help the personnel at the PSAP prioritize the return calls to be made as soon as the issue causing the communication outage has been resolved. Even if the caller only had only one, single chance of making the call because of opportunity, or equipment issues like a failing battery, etc., sufficient information can be collected to send first responders to the caller's aid by practicing an embodiment in accordance with the teachings herein. The email delivery can be tracked, and if the email cannot be delivered to the PSAP, it can be forwarded to an associated PSAP, a secondary/tertiary PSAP, third-party NOCs, or a suitable State entity for research and response, which may be performed on as-requested basis in one implementation. As previously noted, appropriate message objects may be sent to multiple entities where they can be tracked and call failures trended so network issues can be diagnosed and resolved quickly including adding additional physical telecommunications resources if needed. An embodiment of the present invention can also be used to deal with prank callers and keep the call takers free from distraction while still being able to track and respond to the caller if there really is an emergency. It should be further appreciated that in the case of a wireless or VOIP emergency call, the location information is very important because it is subject to change. While the caller is responding to the messaging system, an embodiment of the present invention allows the Location Determination Equipment the ability to get a refined Location fix on the caller and provide it to the PSAP via a suitable message object. Moreover, one skilled in the art will recognize that an example embodiment herein is not dependent on the public safety network resources, which can be limited and constrained. As the communications infrastructure switches have far greater resources available and are less likely to have overflow situations (because the communications switches are often set up in redundant pairs so the call can be handled from a switch that is not in the middle of a natural disaster), embodiments herein advantageously leverage such resources for facilitating emergency call failure mitigation even in mass failure scenarios. If the PSAP is in a situation where it is completely disabled, isolated or abandoned for safety reasons (e.g., because of electromagnetic pulse (EMP) attacks, nuclear/biological/chemical threats, etc.), various email/SMS/MMS/video message objects can be rerouted to another public safety resource until the destination PSAP can be brought back on-line.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated and blocks from different flowcharts may be combined, rearranged, and/or reconfigured into additional flowcharts in any combination or subcombination. Moreover, although some of the diagrams include arrows on communication paths to show a primary direction of communication, it is to be understood that communication may occur in the opposite direction relative to the depicted arrows.

Although various embodiments have been shown and described in detail, the claims are not limited to any particular embodiment or example. None of the above Detailed Description should be read as implying that any particular component, module, element, step, act, or function is essential such that it must be included in the scope of the claims. Reference to an element in the singular is not intended to mean "one and only one" unless explicitly so stated, but rather "one or more" or "at least one". All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An emergency call failure mitigation method, comprising:
   receiving an emergency service call from a calling party pertaining to an emergency situation;
   determining that no voice trunking path is available to a local public safety answering point (PSAP) to service the emergency service call via any network including a cellular telephony network, a landline telephony network or a VOIP network;
   responsive to the determining that no voice trunking path is available to service the emergency service call via any of the networks, routing the calling party to a messaging system operative to prompt the calling party to provide one or more responses relating to the emergency situation;
   generating by the messaging system a messaging object including at least one of the calling party's location, identity of a call receiving device associated with the calling party, type of the calling party and priority of the emergency service call determined based on one or more responses provided by the calling party; and
   forwarding the messaging object to a governmental entity operative to reach the calling party;
   wherein the calling party is prompted by the messaging system in an interactive manner using questions similar to those normally provided by a human operator at a PSAP according to an emergency responder operating procedure.

2. The method as recited in claim 1, wherein the messaging object comprises an email message including a rendition of voice responses provided by the calling party, one or more video files, text files, graphic files, photo images uploaded by the calling party and capabilities of the call receiving device.

3. The method as recited in claim 1, further comprising forwarding the messaging object to an entity comprising another PSAP operative to reach the calling party via at least one of a phone call and a text messaging application.

4. The method as recited in claim 1, further comprising forwarding the messaging object to the local PSAP operative to reach the calling party via at least text messaging.

5. The method as recited in claim 1, further comprising forwarding the messaging object to at least one of a network operations center associated with the local PSAP and a third-party network management node.

6. The method as recited in claim 1, further comprising generating a call failure notification to at least one of a network operations center associated with the local PSAP and a third-party network management node.

7. The method as recited in claim 1, wherein the priority of the emergency service call is determined based on at least one of whether the calling party is an observer of the emergency situation or an afflicted party in the emergency situation, nature of the emergency situation, time of day of the emergency service call, volume of prior emergency service calls pertaining to the emergency situation already received, and whether one or more prior emergency service calls pertaining to the emergency situation have already been serviced.

8. The method as recited in claim 1, wherein the emergency service call is originated using at least one of a landline Public-Switched Telephony Network (PSTN) phone, a wireless mobile communications device operating in one or more wireless technologies involving IEEE 802.11b, IEEE 802.11a, IEEE 802.11g, HiperLan and HiperLan II standards, Wi-Max standard, OpenAir standard, Bluetooth standard, a General Packet Radio Service (GPRS) network technology, an Enhanced Data Rates for Global System for Mobile Communications (GSM) Evolution (EDGE) network technology, a $3^{rd}$ Generation Partnership Project (3GPP)-compliant network technology, an Integrated Digital Enhanced Network (IDEN) technology, a Code Division Multiple Access (CDMA) network technology, a Universal Mobile Telecommunications System (UMTS) network technology, a Universal Terrestrial Radio Access Network (UTRAN) technology, an All-IP Next Generation Network (NGN) technology, a Next Generation 9-1-1 (NG911) technology, an IP Multimedia Subsystem (IMS) technology, a satellite telephony network technology, and an IP-compliant appliance using Voice Over IP (VOIP) technology.

9. An emergency call failure mitigation apparatus, comprising:
   one or more processors;
   a network interface operative to receive a call signaling indication pursuant to an emergency service call from a calling party pertaining to an emergency situation; and
   one or more persistent memory modules having program instructions stored thereon which, when executed by the one or more processors, are configured to:
   determine that no voice trunking path is available to a local public safety answering point (PSAP) to service the emergency service call via any network including a cellular telephony network, a landline telephony network or a VOIP network;
   responsive to the determining that no voice trunking path is available to service the emergency service call via any of the networks, launch a messaging system operative for prompting the calling party to provide one or more responses relating to the emergency situation;
   generate a messaging object including at least one of the calling party's location, identity of a call receiving device associated with the calling party, type of the calling party and priority of the emergency service call determined based on one or more responses of provided by the calling party; and
   forward the messaging object to a governmental entity operative to reach the calling party;
   wherein the messaging system is configured to prompt the calling party in an interactive manner using questions similar to those normally provided by a human operator at a PSAP according to an emergency responder operating procedure.

10. The apparatus as recited in claim 9, wherein the program instructions configured to generate a messaging object comprise program instructions for generating an email message including a rendition of voice responses provided by the calling party, one or more video files, text files, graphic files, photo images uploaded by the calling party and capabilities of the call receiving device.

11. The apparatus as recited in claim 9, wherein the program instructions configured to forward the messaging object further comprise program instructions for forwarding the messaging object to an entity comprising another PSAP operative to reach the calling party via at least one of a phone call and a text messaging application.

12. The apparatus as recited in claim 9, wherein the program instructions configured to forward the messaging object further comprise program instructions for forwarding the messaging object to the local PSAP operative to reach the calling party via at least text messaging.

13. The apparatus as recited in claim 9, wherein the program instructions configured to forward the messaging object further comprise program instructions for forwarding the messaging object to at least one of a network operations center associated with the local PSAP and a third-party network management node.

14. The apparatus as recited in claim 9, wherein the one or more persistent memory modules further comprise program instructions for generating a call failure notification to at least one of a network operations center associated with the local PSAP and a third-party network management node.

15. The apparatus as recited in claim 9, wherein the one or more persistent memory modules further comprise program instructions for determining the priority of the emergency service call based on at least one of whether the calling party is an observer of the emergency situation or an afflicted party in the emergency situation, nature of the emergency situation, time of day of the emergency service call, volume of prior emergency service calls pertaining to the emergency situation already received, and whether one or more prior emergency service calls pertaining to the emergency situation have already been serviced.

16. The apparatus as recited in claim 9, wherein the one or more persistent memory modules further comprise program instructions for ascertaining location of the calling party by inquiring a location database.

17. A non-transitory computer-readable medium containing instructions stored thereon which, when executed by a computer system configured to operate as an apparatus in a communications network, perform the acts:
   receive an emergency service call from a calling party pertaining to an emergency situation;
   determine that no voice trunking path is available to a local public safety answering point (PSAP) to service the emergency service call via any network including a cellular telephony network, a landline telephony network or a VOIP network;
   responsive to the determining that no voice trunking path is available to service the emergency service call via any of the networks, launch a messaging system, configured to prompt the calling party to provide one or more responses relating to the emergency situation;
   generate a messaging object including at least one of the calling party's location, identity of a call receiving device associated with the calling party, type of the calling party and priority of the emergency service call determined based on one or more responses of provided by the calling party; and
   forward the messaging object to a governmental entity operative to reach the calling party;
   wherein the messaging system is configured to prompt the calling party in an interactive manner using questions similar to those normally provided by a human operator at a PSAP according to an emergency responder operating procedure.

18. The non-transitory computer-readable medium as recited in claim 17, wherein the program instructions configured to generate a messaging object comprise program instructions for generating an email message including a rendition of voice responses provided by the calling party, one or more video files, text files, graphic files, photo images uploaded by the calling party and capabilities of the call receiving device.

19. A network device configured to facilitate emergency call failure mitigation in a network, comprising:
   hardware resources including one or more processors, network interface controllers, network interfaces and one or more non-transitory machine readable storage media having program instructions for supporting a virtualization layer; and a virtual network element instantiated by the virtualization layer and is configured to perform:
   responsive to receiving a call signaling indication pursuant to an emergency service call from a calling party pertaining to an emergency situation, determining whether no voice trunking path is available to a local public safety answering point (PSAP) to service the emergency service call via any network including a cellular telephony network, a landline telephone network or a VOIP network;

responsive to the determining that no voice trunking path is available to service the emergency service call via any of the networks, routing the calling party to a messaging system operative to prompt, the calling party to provide one or more responses relating to the emergency situation;

generating a messaging object including at least one of the calling party's location, identity of a call receiving device associated with the calling party, type of the calling party and priority of the emergency service call determined based on one or more responses of provided by the calling party; and forwarding the messaging object to a governmental entity operative to reach the calling party;

wherein the virtual network element is further configured to prompt the calling party by activating a communication session with the calling party in an interactive manner using questions similar to those normally provided by a human operator at a PSAP according to an emergency responder operating procedure.

20. The network device as recited in claim 19, wherein the messaging object generated by the virtual network element comprises an email message that includes a rendition of voice responses provided by the calling party, one or more video files, text files, graphic files, photo images uploaded by the calling party and capabilities of the call receiving device.

21. The network device as recited in claim 19, wherein the virtual network element is further configured to forward the messaging object to an entity comprising another PSAP operative to reach the calling party via at least one of a phone call and a text messaging application.

22. The network device as recited in claim 19, wherein the virtual network element is further configured to forward the messaging object to the local PSAP operative to reach the calling party via at least text messaging.

23. The network device as recited in claim 19, wherein the virtual network element is further configured to forward the messaging object to at least one of a network operations center associated with the local PSAP and a third-party network management node.

24. The network device as recited in claim 19, wherein the virtual network element is further configured to determine the priority of the emergency service call based on at least one of whether the calling party is an observer of the emergency situation or an afflicted party in the emergency situation, nature of the emergency situation, time of day of the emergency service call, volume of prior emergency service calls pertaining to the emergency situation already received, and whether one or more prior emergency service calls pertaining to the emergency situation have already been serviced.

25. The network device as recited in claim 19, wherein the virtual network element is further configured to ascertain location of the calling party by inquiring a location database.

* * * * *